Jan. 10, 1950  B. M. DURFEE  2,493,862
DIVIDING MACHINE
Filed Oct. 3, 1946  15 Sheets-Sheet 8

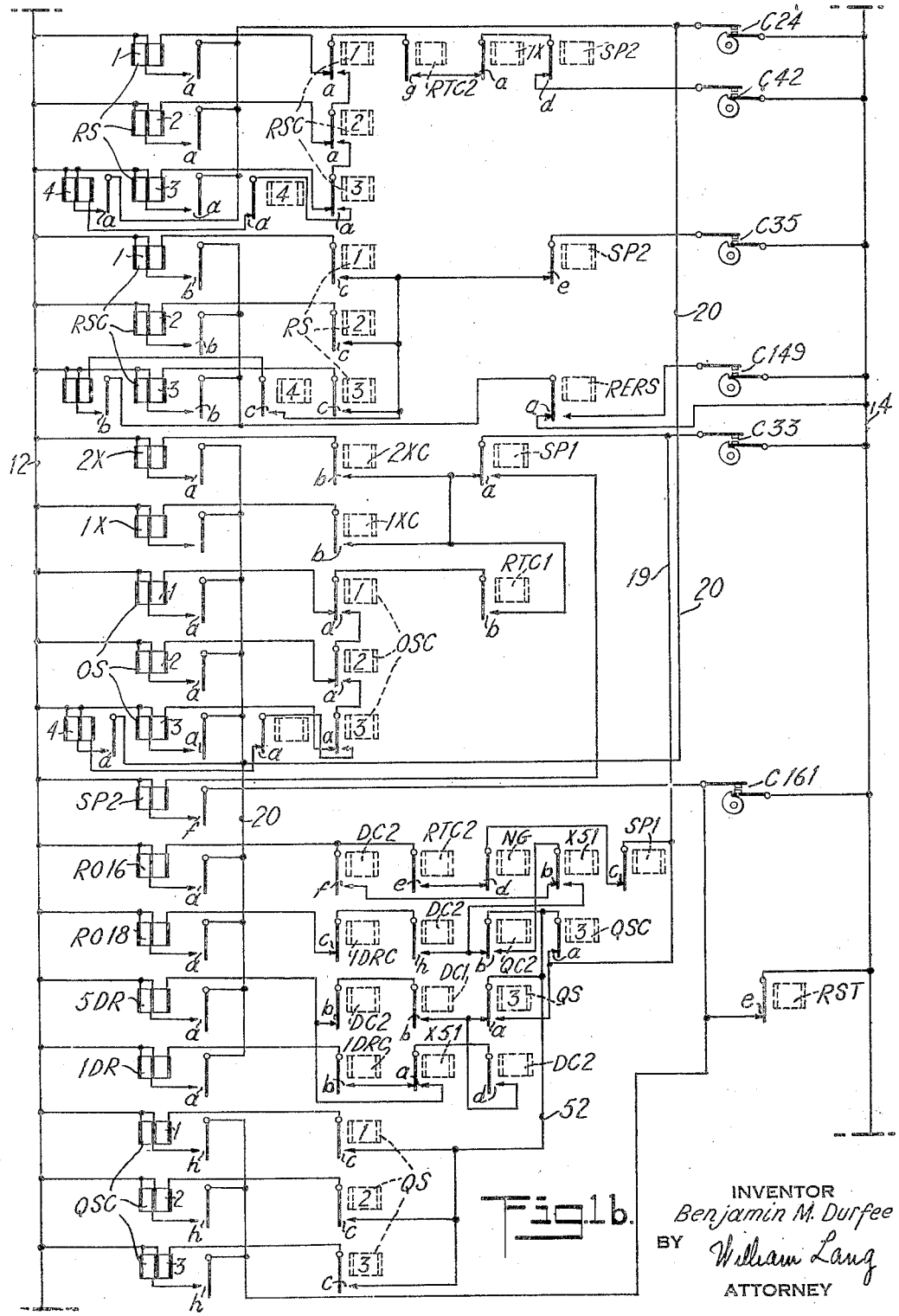

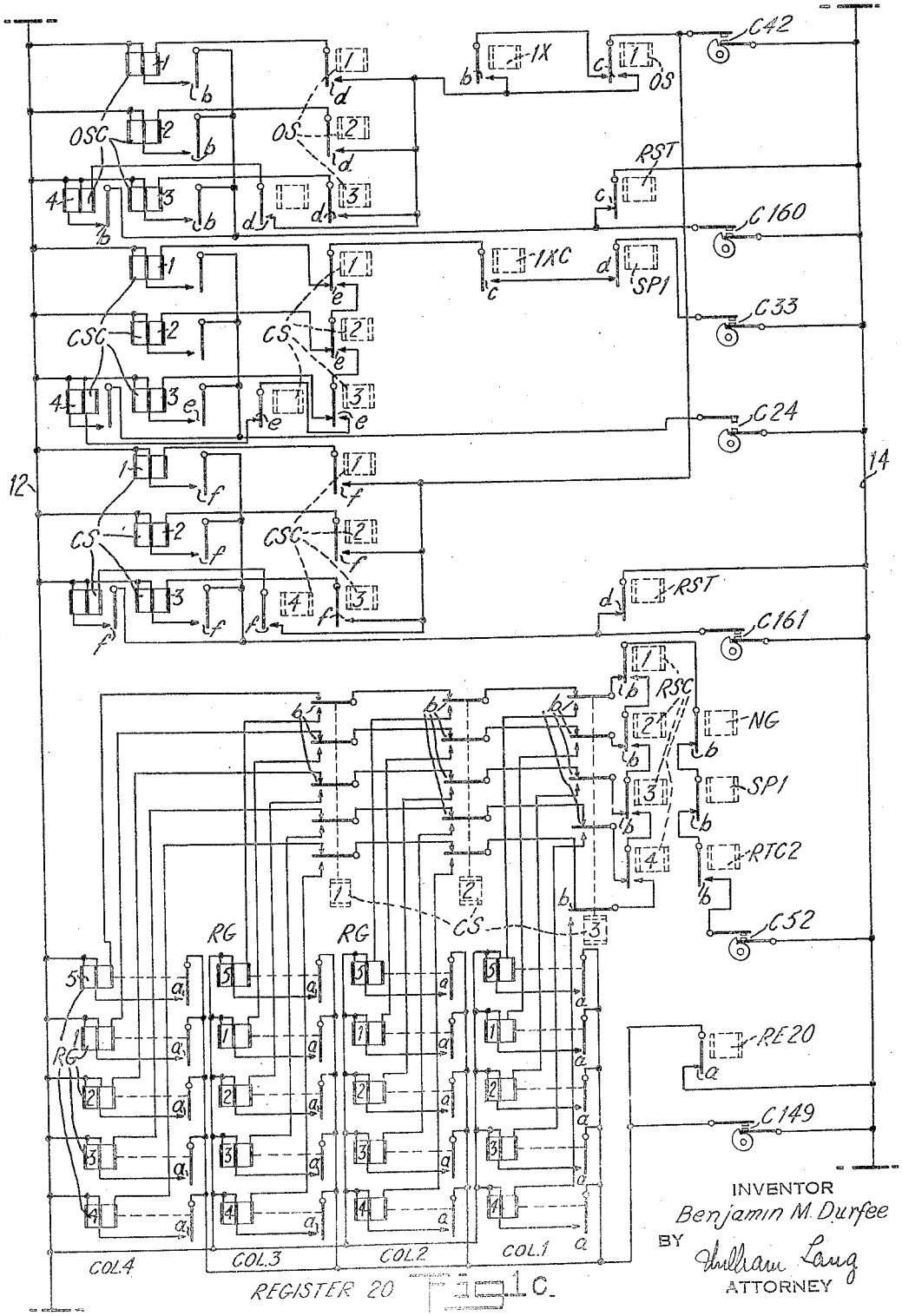

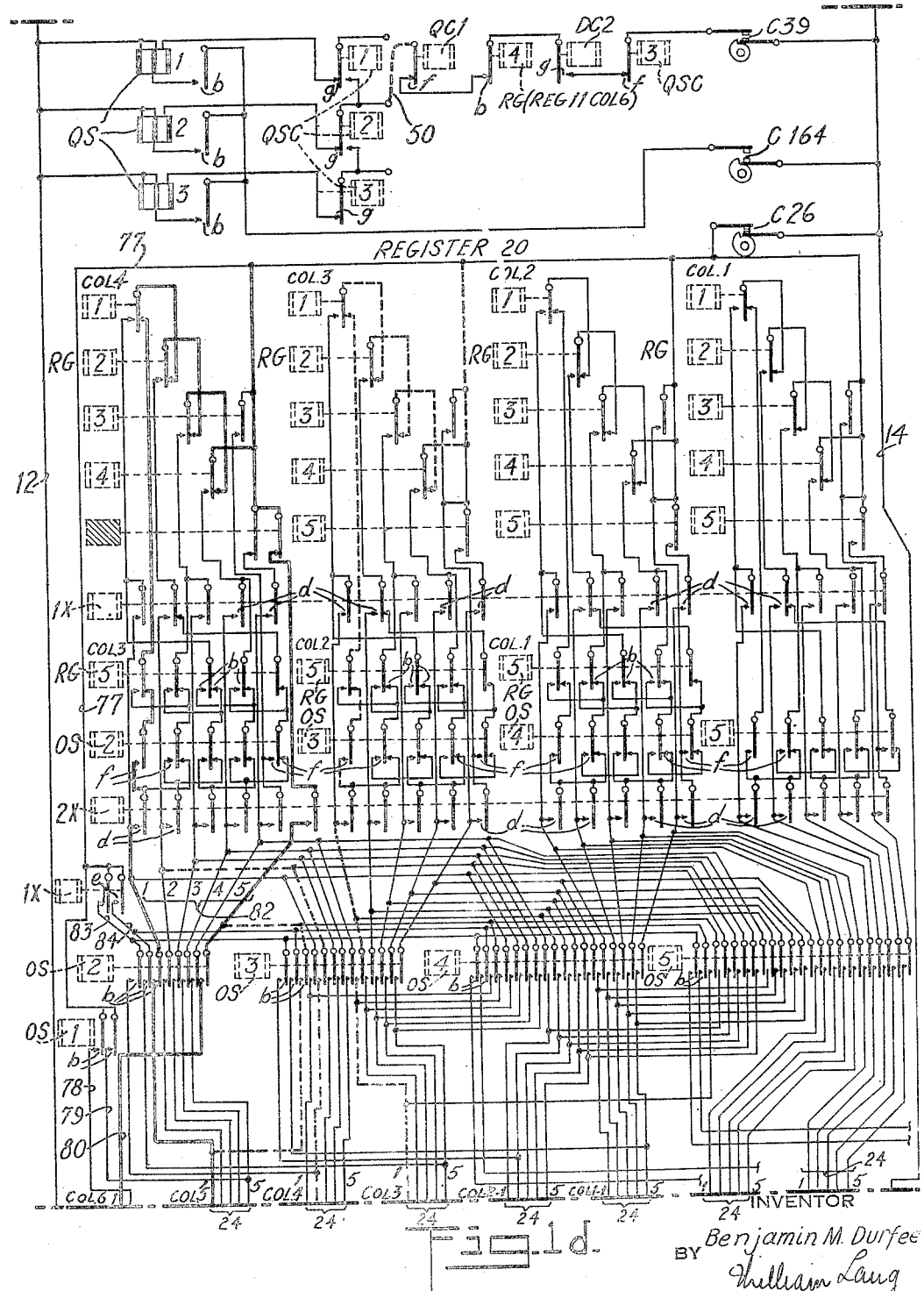

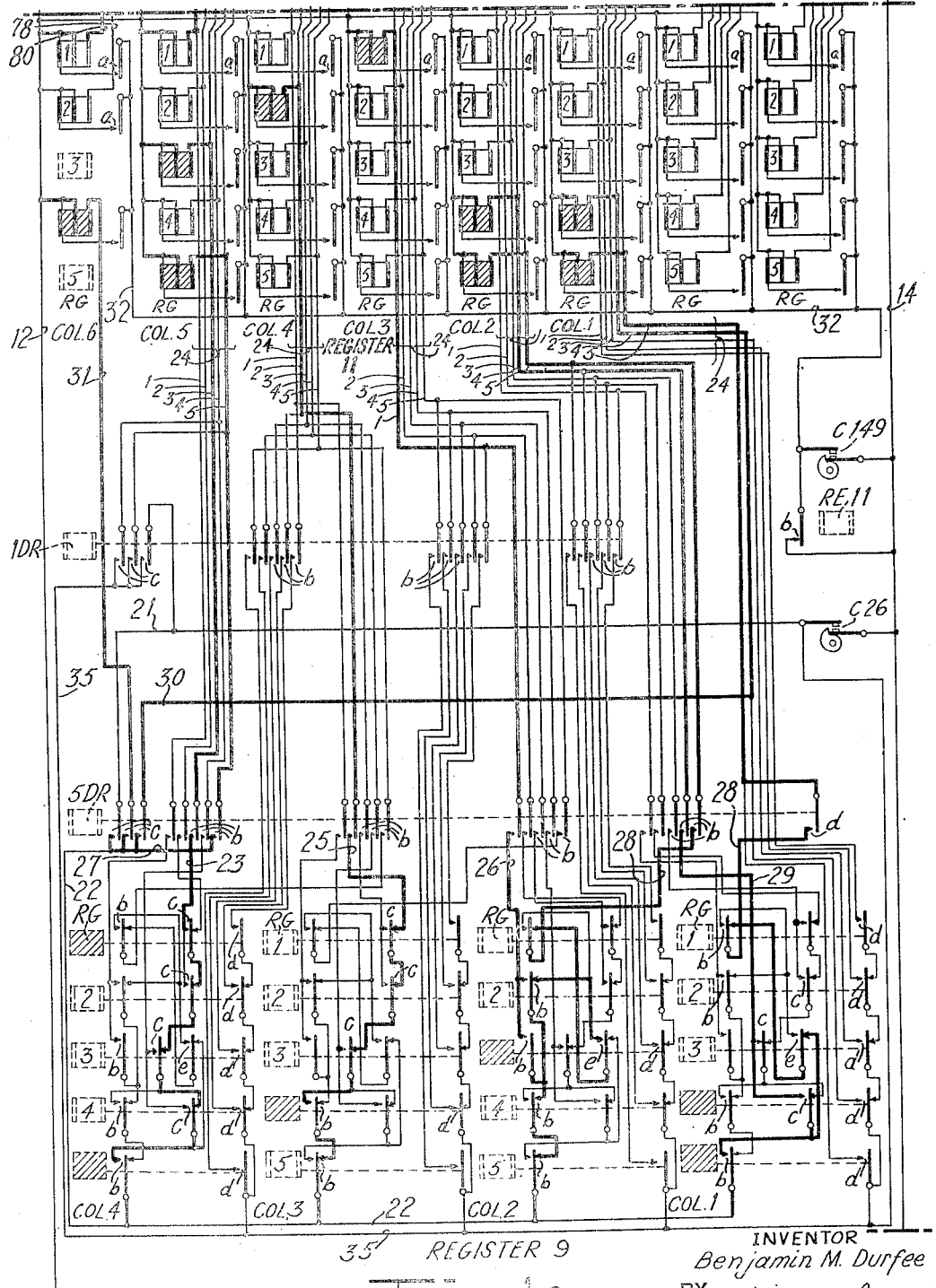

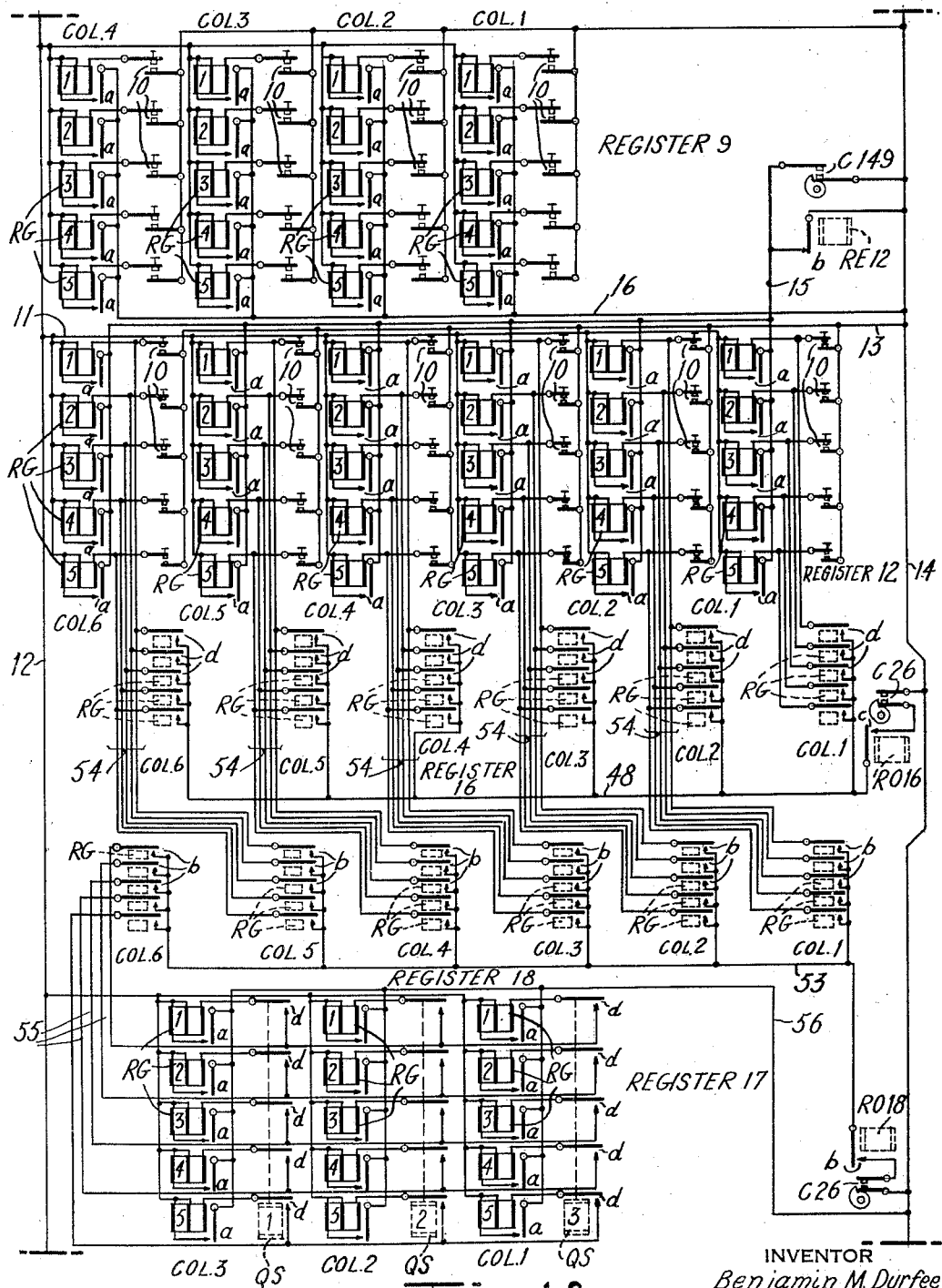

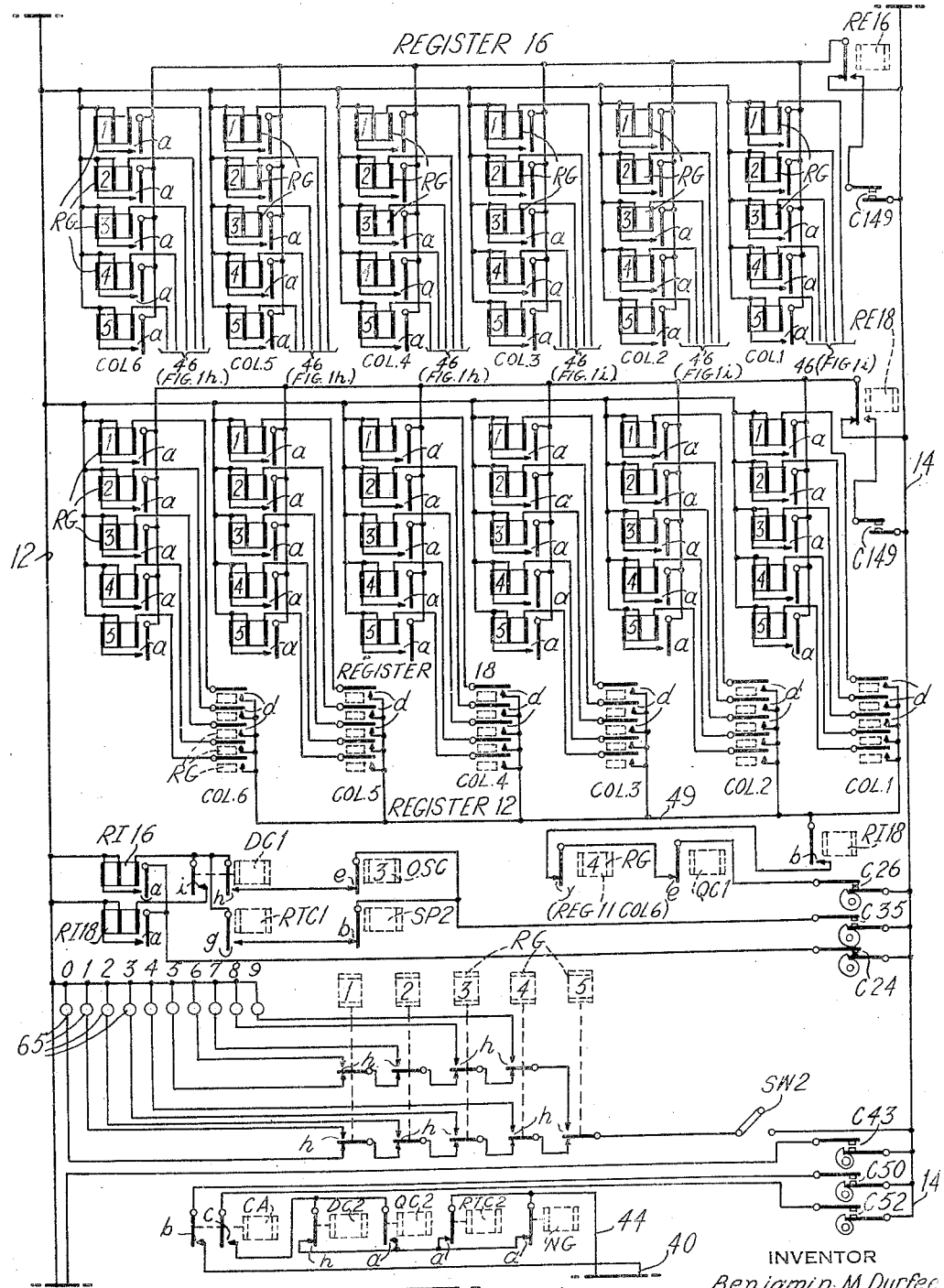

INVENTOR
Benjamin M. Durfee
BY
William Lang
ATTORNEY

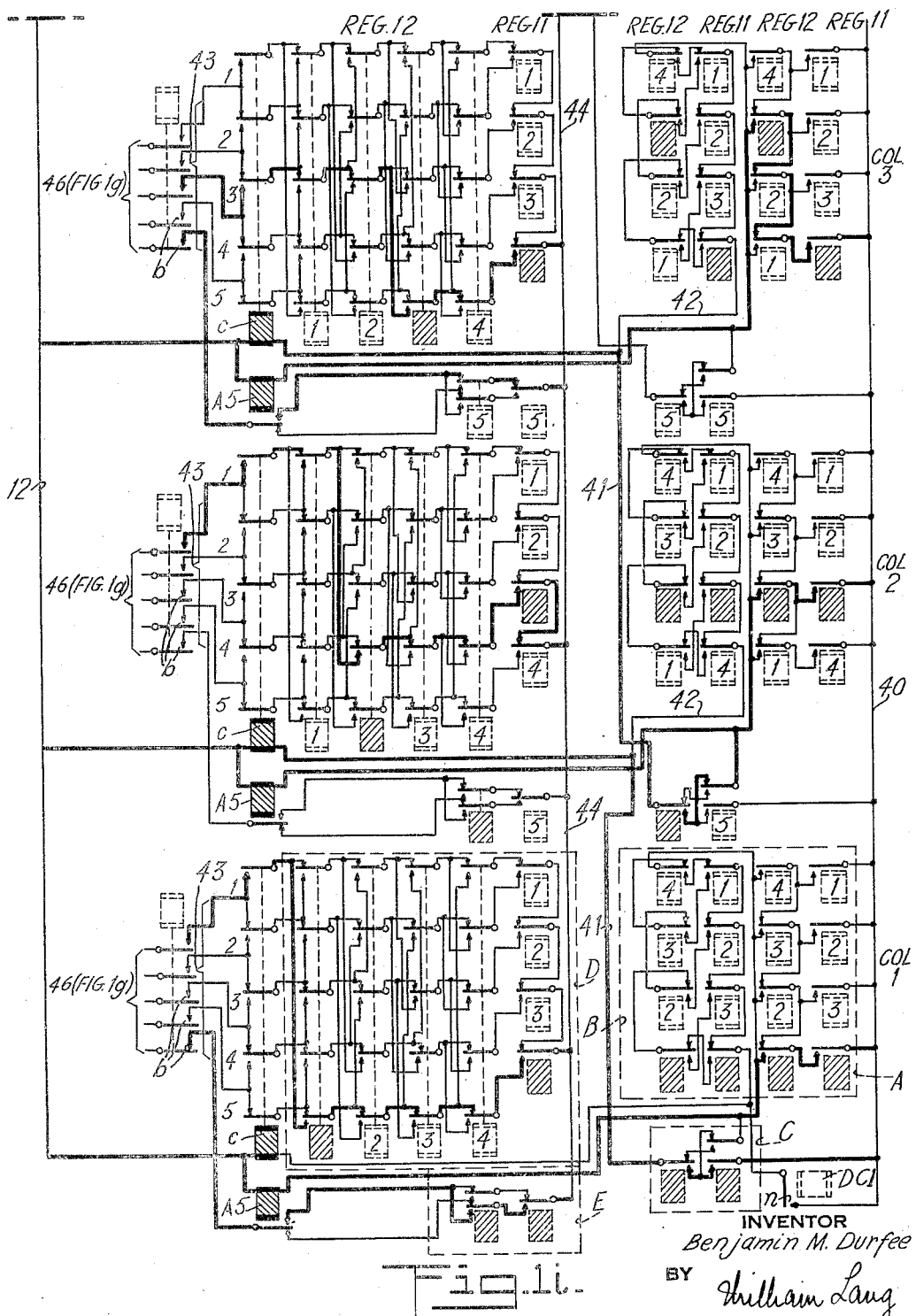

Jan. 10, 1950     B. M. DURFEE     2,493,862
DIVIDING MACHINE

Filed Oct. 3, 1946     15 Sheets-Sheet 11

INVENTOR
Benjamin M. Durfee
William Lang
ATTORNEY

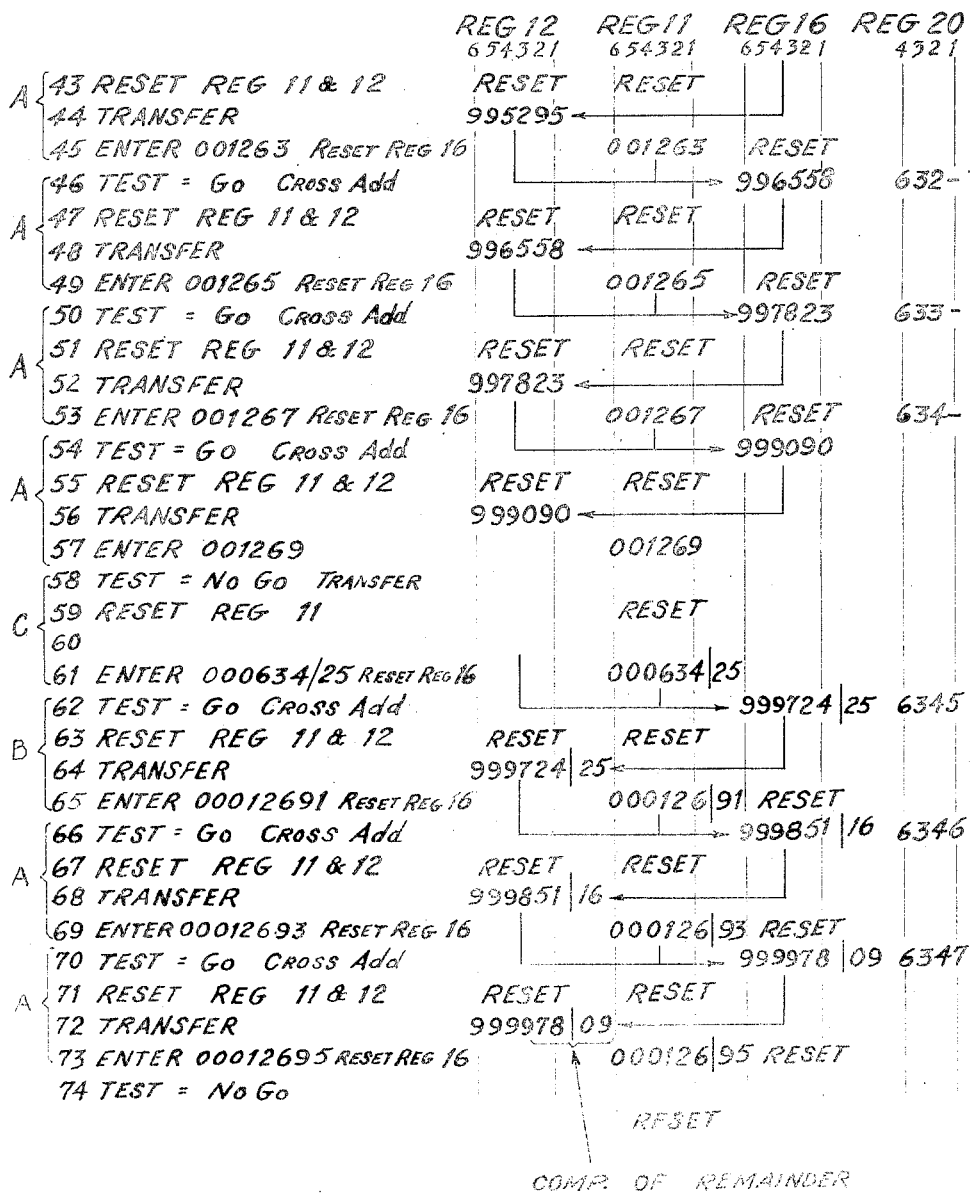

Fig 5

Jan. 10, 1950  B. M. DURFEE  2,493,862
DIVIDING MACHINE

Filed Oct. 3, 1946  15 Sheets-Sheet 15

Fig 6

INVENTOR
*Benjamin M. Durfee*
BY *William Lang*
ATTORNEY

Patented Jan. 10, 1950

2,493,862

UNITED STATES PATENT OFFICE 2,493,862

DIVIDING MACHINE

Benjamin M. Durfee, Binghamton, N. Y., assignor to International Business Machines Corporation, New York, N. Y., a corporation of New York Application October 3, 1946, Serial No. 700,877

13 Claims. (Cl. 235—61)

This invention relates to improved computing or calculating methods and apparatus for the performance of dividing and square root extraction problems.

More particularly, it relates to improvements in the operation and circuit arrangement of an electromechanical relay type of computing mechanism, whereby the assemblage of relatively simple combinations and arrangements of such devices enables the rapid, accurate solution of mathematical problems.

A specific object of the invention is to provide a dividing appartus based generally on the over-and-over subtraction method of computation modified to the extent of providing for the subtraction of multiples of five times the divisor. To this end there is provided a novel register settable to represent a divisor and provided with a readout device which selectively reads out either the divisor (in complementary form) or 5 times the divisor (in complementary form) in response to a single electrical impulse.

In the operation of the apparatus, after representations of the divisor and dividend have been set up in separate registers of the relay type, a third register is automatically set up to represent 5 times the divisor (in complementary form) with a 4 set up to the left of the highest complement digit. A test is then made through an electrical impulse, to ascertain the relative magnitude of the values of the dividend and the multiple set up. If the test indicates a "go" condition (while the multiple is less than the dividend), subtraction takes place in response to a third electrical impulse to obtain the remainder and concurrently, as a result of the tens carry condition, the entered quotient digit 4 is raised to 5.

Thereafter, the divisor is repeatedly set up in complementary form and compared with the remainder and each time a "go" condition is found, subtraction occurs with accompanying increase of the quotient digit by 1. Upon detection of a "no go" condition, the quotient digit is set up in a separate register and the remainder is set up as a new dividend with a columnar shift. 5 times the divisor is then compared with this remainder as before.

The operation is automatic in its selective comparing of 5 times or 1 times the divisor in appropriate sequence and continues until a predetermined number of quotient digits have been computed.

The handling of square root problems involves the same comparing and subtracting devices used for dividing and employs the method of repeatedly subtracting from the amount whose root is sought the terms of the series of odd numbers 1, 3, 5, 7, 9, etc. which are the differences between the series of squares 1, 4, 9, 16, 25, 36, etc. The process commences after the amount is set up by effecting a setting of the fifth square 25 of the series and testing to ascertain if it will go into the highest part of the amount. If it goes, subtraction occurs and a 5 is set up in a root register. Thereafter, the odd number 11 corresponding to the next square 36 is set up and compared with the remainder and, if it goes, the root is increased to 6 and the next term 13 corresponding to the next square 49 is tried.

A special arrangement is provided to obtain the successive odd terms by providing the root register with a novel readout whereby, in response to a single electrical impulse, a reading is obtained of twice the root amount standing in the register increased by one unit. Thus, a 5 is read out as 11 or 2 times 5 plus 1, and a 6 is read out as 13 or 2 times 6 plus 1, etc. When a final root digit for any denomination is obtained, the next term to be tested will be that required to test for the square of the root part already obtained with a 5 to the right; that is, if a 6 is found to be the first root digit, the next tested for is 65 and the term to be tested is 625. The root register is arranged to obtain this value in response to a single electrical impulse to read out the root digit with 25 to the right or 100 times the root plus 25.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1a, 1b, 1c . . . 1i arranged vertically in the order named constitute a wiring diagram of the electric circuits of the machine.

Fig. 3 is a sequence chart showing the order in which various magnets are energized for the example of Fig. 2.

Figure 4A:
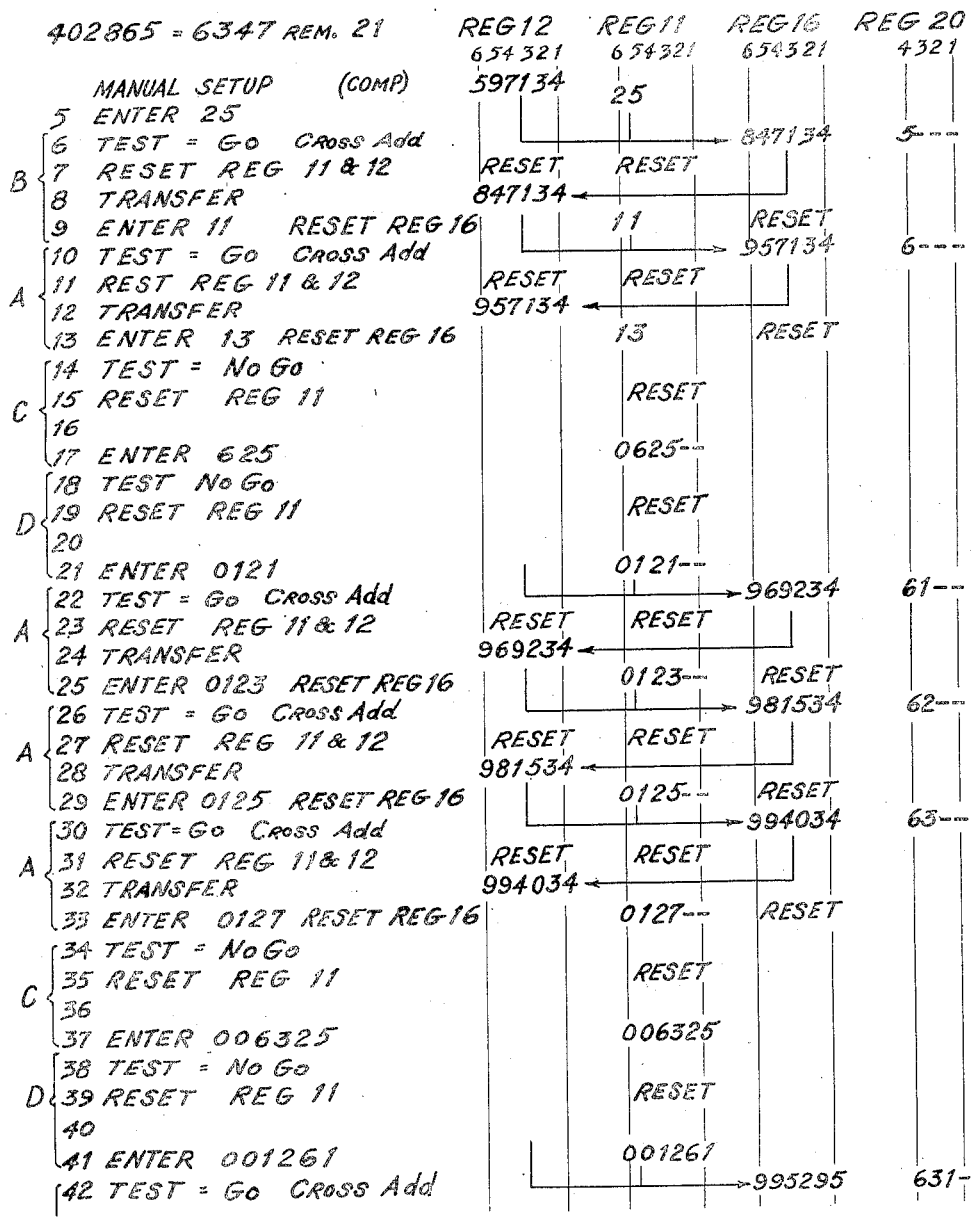

Figs. 4a and 4b constitute a chart showing the steps involved in the extraction of the square root for a specific example.

Figure 5:
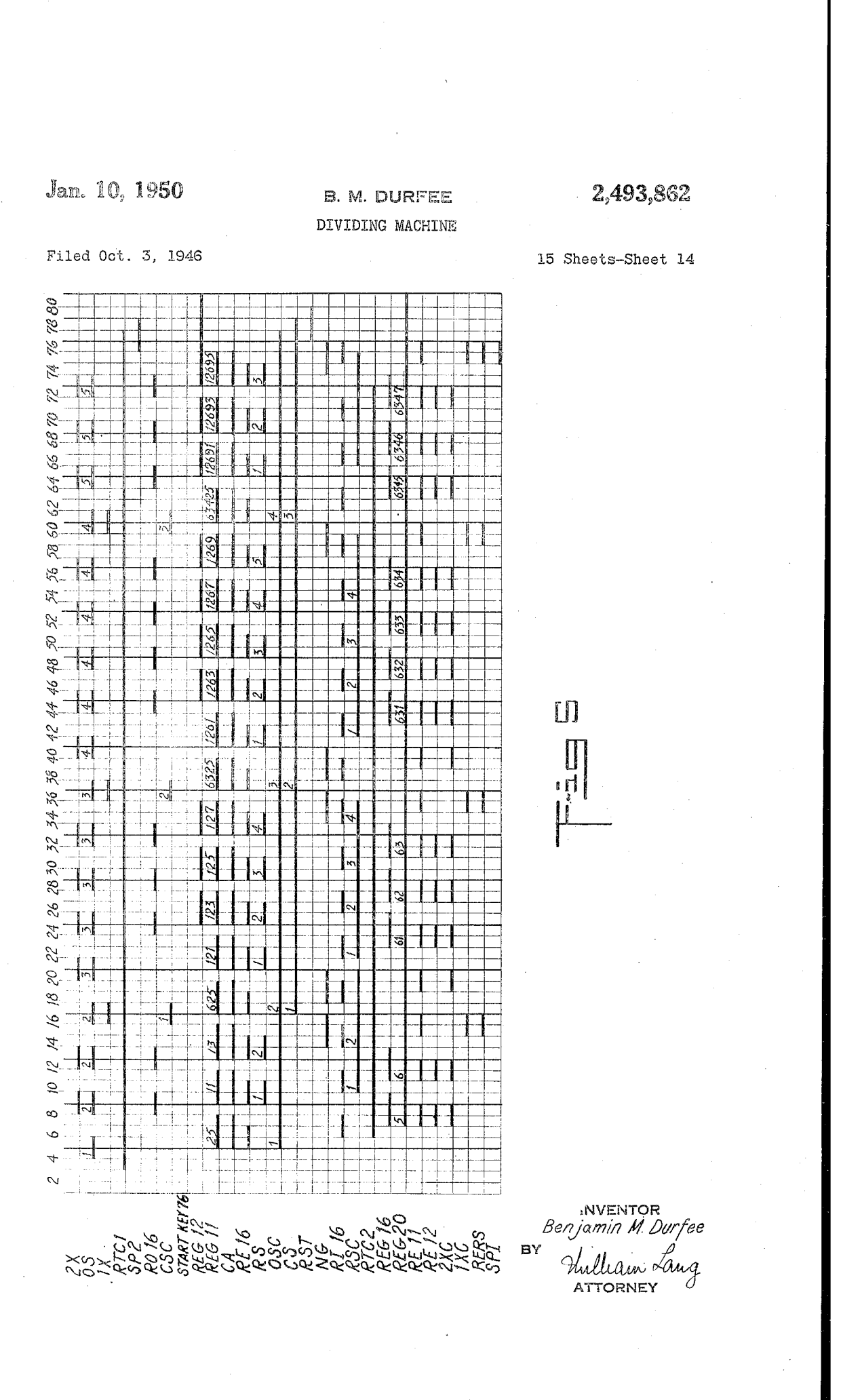

Fig. 5 is a sequence chart showing the order in which the several magnets are energized in carrying out the square root extraction problem.

Fig. 6 is a timing chart of the several cam controlled contacts of the machine.

Division

Figure 2:
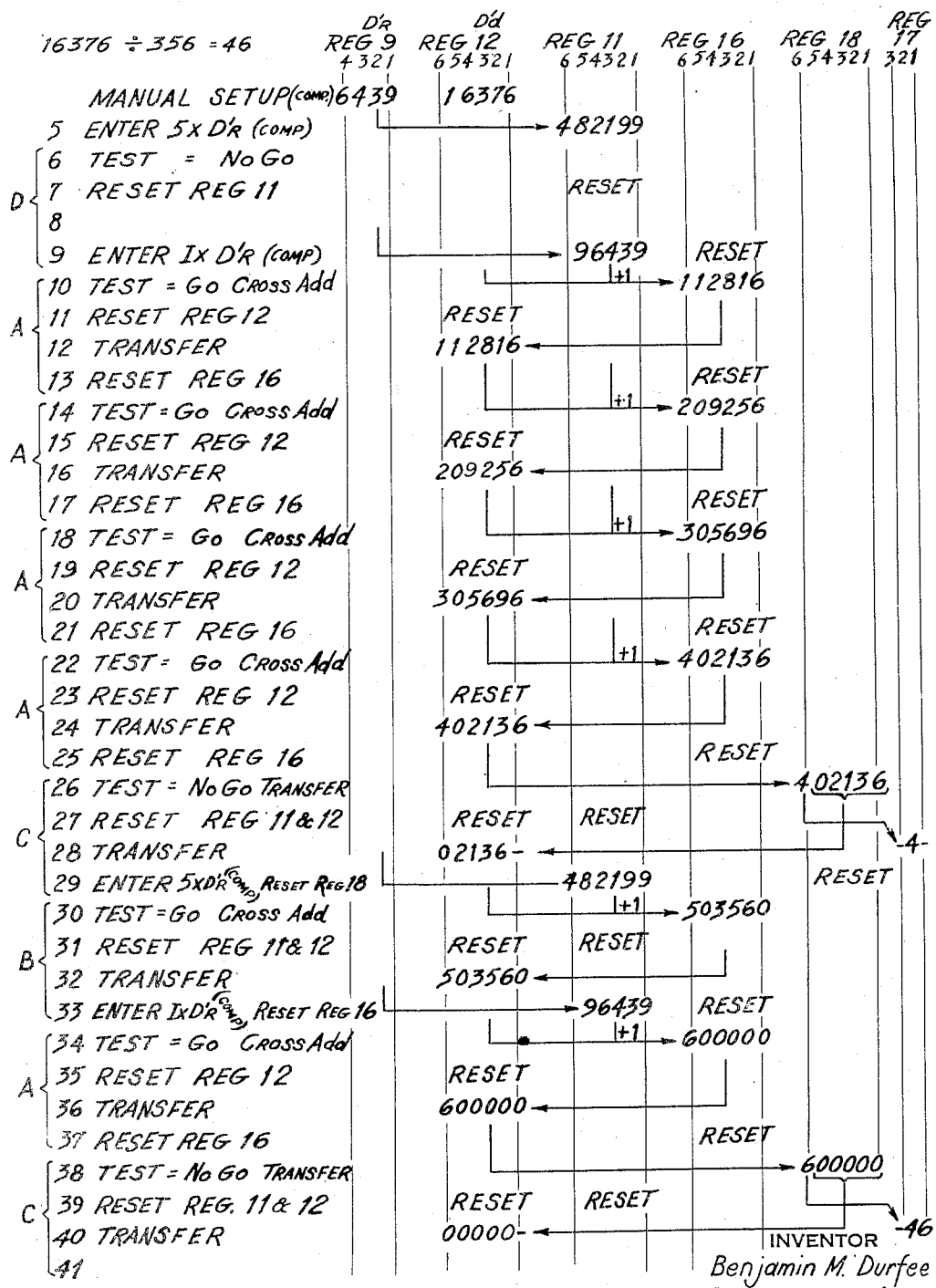
Fig. 2 is a diagram showing the steps involved in the dividing procedure for the specific problem.
Figure 11:
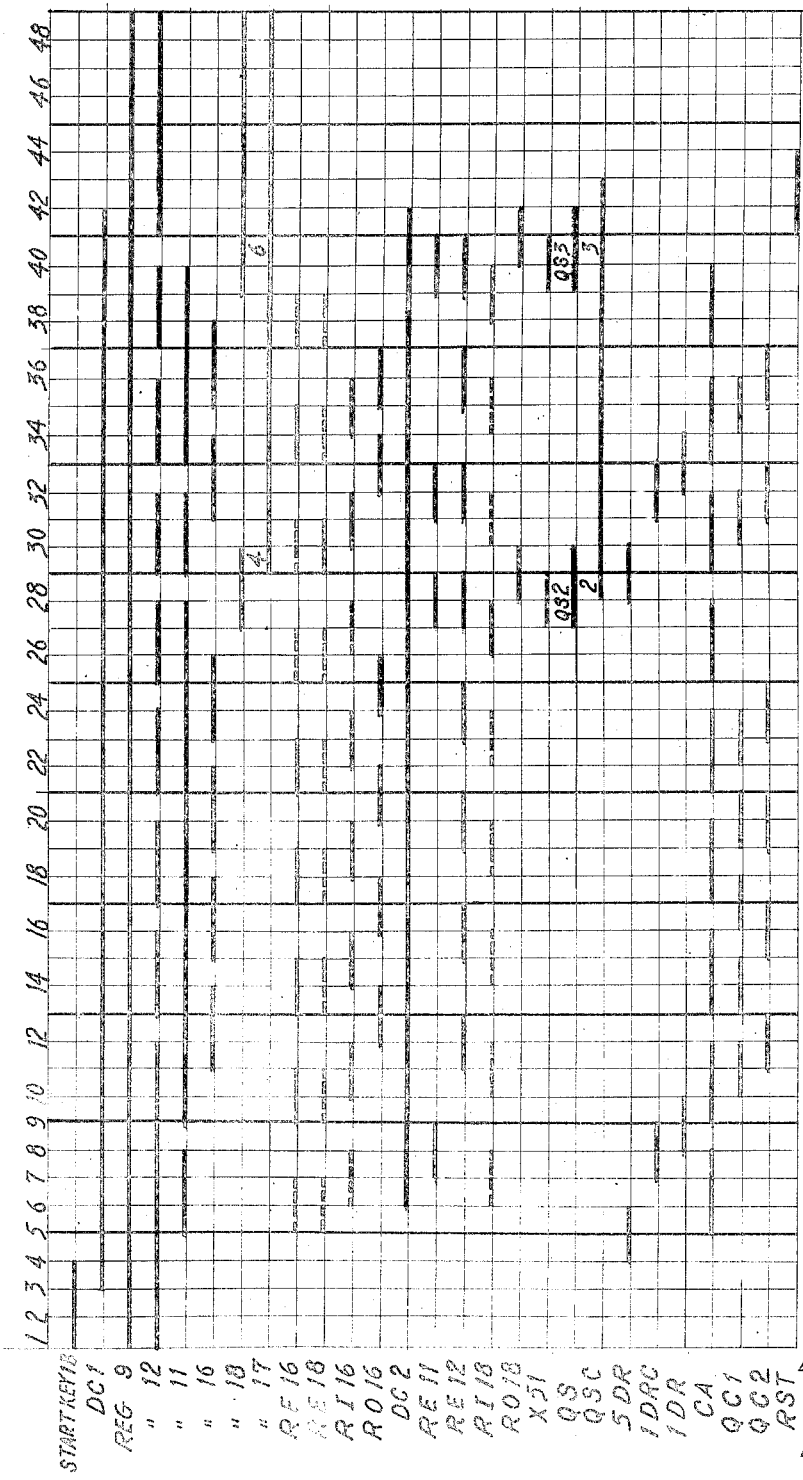

Referring to Fig. 2, a general explanation will first be given to point out the various steps involved in the procedure of dividing.

The problem involved is 16376 divided by 356 to obtain a quotient 46. Six registers are involved with columnar or denominational capacities as indicated by numerals at the head of the several register columns. These registers are of the relay type with five relay magnets per columnar order, wherein values are entered in accordance with the so-called quinary system of numeration. In order to simplify the disclosure, the divisor and dividend amounts will be entered or set up manually. Specifically, the dividend 16376 is set up in the first five columns of register 12, and the divisor 356 is set up as a 9's complement in the three highest columns of register 9 with the remainder order of the register set up with the complement of 0, which is 9 as indicated on the line designated "manual set up". After this has been done, the further operations proceed automatically, and the first step in the procedure is to enter the complement of 5 times the divisor into register 11. This entry is effected under control of the setting in register 9, through a special wiring arrangement, whereby the complement of 5 times the divisor which is 8219 is entered in columns 2 to 5. Concurrently therewith, a 9 is entered in column 1 and a 4 is entered in column 6. This entry is represented along line 5 of Fig. 2.

In the next step of the procedure, a test or comparison is made between the settings in registers 11 and 12, which determines whether 5 times the divisor is less than the dividend. For the present example, the test results in what will hereinafter be termed a "no go" indication signifying that 5 times the divisor will not go into the dividend. As a result of this comparison, register 11 will be reset and, as indicated on line 9, the 9's complement of 1 times the divisor (643) is entered into register 11 with 9's also entered in columns 1 and 5. The test is again made as indicated on line 10, and this time the result of the comparison indicates that the divisor will go into the dividend. A so-called "cross add" operation is then brought about, wherein the amount standing in register 12 is added to that in register 11 plus a "fugitive 1" and entered into register 16 as the value 112816. The registers 11 and 12 are interwired to constitute a so-called cross adding device, whereby when an amount is set up in each the sum thereof may be read out and entered in another register.

For purposes of the present invention, this cross add device is provided with a fugitive 1 arrangement whereby, for each cross adding operation during the dividing process, the value in the lowest order or column 1 of the receiving register 16 is increased by 1, so that the amount now standing in register 16 represents the sum of the amounts in registers 11 and 12 plus the fugitive 1.

In the next step (line 11), register 12 is reset and thereafter the amount in register 16 is transferred to register 12 as the new dividend, following which register 16 is reset as indicated along line 13. The test operation now repeats as a "go" indication, so that the cross adding operation is repeated to enter the amount 209256 in register 16. This amount is then transferred back to register 12 after the previous setting has been canceled and a further test is made with another "go" condition, so that cross adding repeats for the third time to obtain the amount 305696 as indicated on line 18. Again transferring takes place back to register 12, and the fourth test results in the amount 402136 in register 16 as indicated on line 22. Then this amount is transferred back to register 12 and register 16 is reset.

It will be noted that for each cross adding operation the digit in columns 6 of registers 12 and 16 is progressively increased one unit, so that this column progressively represents the quotient digit.

As indicated along line 26, the result of the next test indicates a "no go" condition, and as a result the amount in register 12 is now directly transferred to register 18, following which both registers 11 and 12 are reset. Thereafter, as indicated on line 28, the amount standing in columns 1–5 in register 18 is transferred back to register 12 with a columnar shift one place to the left. Concurrently, the quotient digit in column 6 of the register 18 is transferred to column 2 of register 17, wherein it remains stored as one of the quotient digits.

As indicated on line 29, the complement of 5 times the divisor is now again entered in register 11, and the result of the test indicates that there is a "go" condition, so that cross adding takes place with the sum of 503560 entered in register 16, which is transferred to register 12 after registers 11 and 12 have been reset.

Thereafter, as indicated on line 33, the complement of 1 times the divisor is entered in register 11 and register 16 is reset. Subsequent test results in a "go" condition and a cross addition to enter the amount 600000 into register 16, which amount transfers back to register 12, and upon the next test a "no go" condition is signified to transfer the amount 600000 directly to register 18. Following this, the value in columns 1–5 of register 18 is transferred to register 12 with the 1 column shift to the left, and the digit 6 in column 6 of register 18 is transferred to the first column in register 17, so that the quotient 46 of the two factors is now standing in register 17.

In the physical operation of the machine, each of the lines of Fig. 2 represents an electrical impulse period so that, after the dividend and divisor have been manually set up in registers 9 and 12, the quotient 46 will have been obtained in register 17 after forty impulse periods, the first of which is arbitrarily designated as the 5 impulse.

Examination of the diagram in Fig. 2 indicates that the calculation proceeds on what may be termed a "four impulse" basis, that is, with a test occurring every fourth impulse, and that at each test period one of four different conditions may obtain. These four conditions may be tabulated as follows:

A. "Go" condition with 1 times the divisor in register 11;
B. "Go" condition with 5 times the divisor in register 11;
C. "No Go" condition with 1 times the divisor in register 11;
D. "No Go" condition with 5 times the divisor in register 11.

These four conditions are exemplified, respectively, at lines 10, 30, 26 and 6, and for each condition the succeeding reset, transfer and entry operations will vary as summarized in the following:

For condition A

1. Cross add into register 16.
2. Reset register 12.
3. Transfer from register 16 to register 12.
4. Reset register 16.

For condition B

1. Cross add into register 16.
2. Reset registers 11 and 12.
3. Transfer from register 16 to register 12.
4. Enter 1 times the divisor into register 11 and reset register 16.

For condition C

1. Transfer from register 12 to register 18.
2. Reset registers 11 and 12.
3. Transfer columns 1–5 of register 18 to register 12 with column shift, and transfer column 6 of register 18 to register 17.
4. Enter the complement of 5 times the divisor into register 11 and reset register 18.

For condition D

1. No cross adding operation takes place.
2. Reset register 11.
3. Idle operation.
4. Enter 1 times the divisor into register 11 and reset register 16.

The specific manner in which the foregoing operations are carried out by the mechanism will now be explained with reference to the circuit diagram. In the circuit diagram (Figs. 1a to 1i), the various magnets and their related contacts are arranged to minimize the number of cross circuit connections by arranging the contacts in close association with the circuits which they control and indicating the related relay magnets adjacent thereto with suitable identifying designations.

In the circuit diagram the register magnets or relays will be given the common designation RG, and these will be suitably grouped and identified as related to particular registers. Switch SW (Fig. 1a) is first closed to place current on main lines 12 and 14.

*Manual entry of the dividend in register 12.*—Referring to Fig. 1f, register 12 is represented as comprising six columns of magnets RG. In each column, the magnets are designated 1, 2, 3, 4 and 5 to represent digital values in accordance with the quinary system of numeration, i. e. the digit values 1, 2, 3 and 4 are represented by energization of correspondingly numbered magnets RG, and the digits 6 to 9 are represented by energization of a 5 magnet RG and an appropriate one of the other four. Each magnet has a double winding, one of which is connected to key contacts 10 and through common conductor 11 to left side of main line 12. The key contacts 10 are connected through the common wire 13 to main line 14 so that, when any key contacts are closed, a circuit will be completed through the corresponding magnet RG to energize the same.

For the example of Fig. 2, the contacts 10 associated with the 1 magnet in column 5 of register 12 are closed manually, the contacts associated with the 5 and 1 magnets in column 4, the contacts associated with the 3 magnet in column 3, the contacts associated with the 5 and 2 magnets in column 2 and the contacts associated with the 5 and 1 magnets in column 1 are closed momentarily, so that the magnets RG in register 12 will be energized to represent the value 16376. Each magnet RG will close a pair of holding contacts designated a, which for those magnets energized will complete a holding circuit from line 12, through the second or holding winding of the magnet, its a contacts and common wire 15 to b contacts of reset magnet RE12 and line 14.

*Manual entry of the divisor in register 9.*—In a like manner key contacts 10 associated with register 9 (Fig. 1f) are operated in the 4 columns of this register in accordance with the 9's complement of the divisor, that is, these key contacts are closed to set up the value 643 in the three highest orders, and with a 9 in the first or lowest order for the example chosen which will result in energization of the appropriate magnets RG of register 9, and these will close their holding contacts a to provide a holding circuit through common wire 16 to line 14 to hold until the main switch SW is opened.

*Start circuits.*—In the circuit diagram are shown a number of cam operated contacts, all of which are designated with the prefix C. The cams for controlling these contacts are all mounted on a common shaft which is caused to rotate continuously through a suitable power source. The timing of the contacts controlled by these cams is shown in Fig. 6 for one revolution, and it will be understood that this is repeated. In this time chart the cycle is divided into four impulse periods, during which the successive operations explained in connection with Fig. 2 occur.

To commence dividing operations, the dividing start key 17 (Fig. 1a) is operated to close contacts 18. These are held closed momentarily so that, when contacts C3 close at the 3 point in a cycle, a circuit is completed through these contacts and contacts 18 to energize the divide control magnet designated DC1, which will close its a contacts to provide a holding circuit through normally closed a contacts of restart magnet RST.

In the sequence diagram (Fig. 3), the point at which this magnet DC1 is energized is indicated for a period of holding which is also represented. In the diagram it is also indicated that register 9 and register 12 have the magnets thereof in energized condition at the start of the cycle. It is also indicated that the start contacts 18 may be opened after magnet DC1 has been energized.

At the 4 time in the cycle, a circuit is completed from line 14 (Fig. 1b), through cam contacts C33, wire 19, normally closed a contacts of a magnet designated QSC and numbered 3, a contacts of the magnet designated QS (also numbered 3), b contacts of magnet DC1 (now closed), b contacts of the magnet designated DC2, magnet 5DR to line 12. This magnet will close its a contacts to provide a holding circuit through common wire 20 and cam contacts C24 which will hold magnet 5DR energized for the period indicated in Fig. 3. Energization of this magnet will prepare circuits for transferring the complement of 5 times the divisor into register 11 during the next or 5 period in the cycle.

*Entering the complement of 5 times the divisor.*—The circuit connections involved in the transfer to register 11 are shown in Fig. 1e, wherein the contacts controlled by magnets RG in register 9 are shown at the bottom of the figure where they are designated b, c, d, e. The register magnets RG of register 11 are shown at the top of the figure and near the center are shown contacts of magnet 5DR designated b. The register magnets RG of register 9 are cross hatched in representation of the ones that are energized at this time for the specific problem and the RG magnets of register 11 are also cross hatched with their energizing circuits emphasized to facilitate tracing thereof. With magnet 5DR energized, its contacts b will be closed, together with three additional contacts designated c. When cam contacts C26 close at the 5 point of time of the sequence, a circuit is traceable from line 14, contacts C26, wire 21, the left hand c contact of magnet 5DR, wire 22 extending to the b contacts of the 5 magnet RG in column 4 of register 9.

In the left hand column of this register, the circuit will continue through the b contacts of the 5 magnet (now shifted), c contacts of the 4 magnet, c contacts of the 3 magnet, c contacts of the 2 magnet, c contacts of the 1 magnet (now shifted), wire 23, through one of the b contacts of magnet 5DR (now closed), the 3 wire of the group designated 24, the 3 magnet RG in column 5 of register 11 to line 12.

In column 3 of register 9, the circuit extends from wire 22, through the b contacts of the 5 magnet, the b contacts of the 4 magnet (now shifted), c contacts of the 3 magnet, c contacts of the 2 magnet, c contacts of the 1 magnet, wire 25, one of the b contacts of magnet 5DR, to the 2 wire of the group 24 associated with column 4 of register 11 to the 2 magnet RG in this group to line 12.

In column 2 of register 9, the circuit extends through the b contacts of magnet 5, b contacts of magnet 4, b contacts of magnet 3 (now shifted), wire 26, one of the b contacts of magnet 5DR to the 1 wire of the group 24 associated with column 3 of register 11, the 1 magnet RG in this order to line 12.

A parallel circuit extends at this time from line 14, through contacts C26, wire 21, the left hand c contact of magnet 5DR, wire 27, one of the b contacts of magnet 5DR, the 5 wire 24 related to column 5 of register 11, the 5 magnet RG in this order to line 12.

In column 2 of register 9 a further circuit is traceable from wire 22, b contacts of magnet 5, b contacts of magnet 4, b contacts of magnet 2, e contacts of magnet 3 (now shifted), b contacts of magnet 1, wire 28, a pair of b contacts of magnet 5DR, to the 5 wire of the group 24 related to the column 2 of register 11, thence through the 5 magnet RG in this order to line 12.

In column 1 of register 9, a circuit extends from wire 22, through b contacts of magnet 5 (shifted), b contacts of magnet 4 (shifted), wire 29, one of the b contacts of magnet 5DR to the 4 wire of the group 24 related to column 2 of register 11 to the 4 magnet RG and line 12.

In column 1 of register 9, a further circuit is completed from wire 22, b contacts of magnet 5 (shifted), e contacts of magnet 3, b contacts of magnet 1, wire 28 of this order, thence through a pair of d contacts of magnet 5DR to the 5 wire of the group 24 related to column 1 in register 11 to the 5 magnet RG to line 12.

A further circuit is completed at this time from line 14, contacts C26, wire 21, left hand c contact of magnet 5DR, right hand c contacts, wire 30, which extends to the 4 wire of the group 24 related to column 1 of register 11, and thence through the 4 magnet RG to line 12.

Finally, there is a circuit extending from contacts C26, through wire 21, the left hand c contacts of magnet 5DR, thence through the central c contacts, wire 31, to the 4 magnet RG in column 6 of register 11 and thence to line 12. In this manner the energization of magnet 5DR followed by closure of contacts C26 will transmit impulses through the contacts of register 9 to energize the magnets RG of register 11 in accordance with the complement of 5 times the divisor in columns 2 to 5, an additional 9 in column 1 and a 4 in column 6. This 4 is a potential quotient digit and column 6 serves as a temporary storage device to retain the setting. When the several RG magnets of register 11 are energized, they close their a contacts (Fig. 1e) to provide holding circuits through the magnets which extend through a common wire 32 and cam contacts C149 and b contacts of reset magnet RE11 to line 14. Setting of register 9 to represent any other amount will similarly result in energization of RG magnets of register 11 to represent the complement of 5 times the amount with a 9 to the right and a 4 to the left.

Figure 1A:
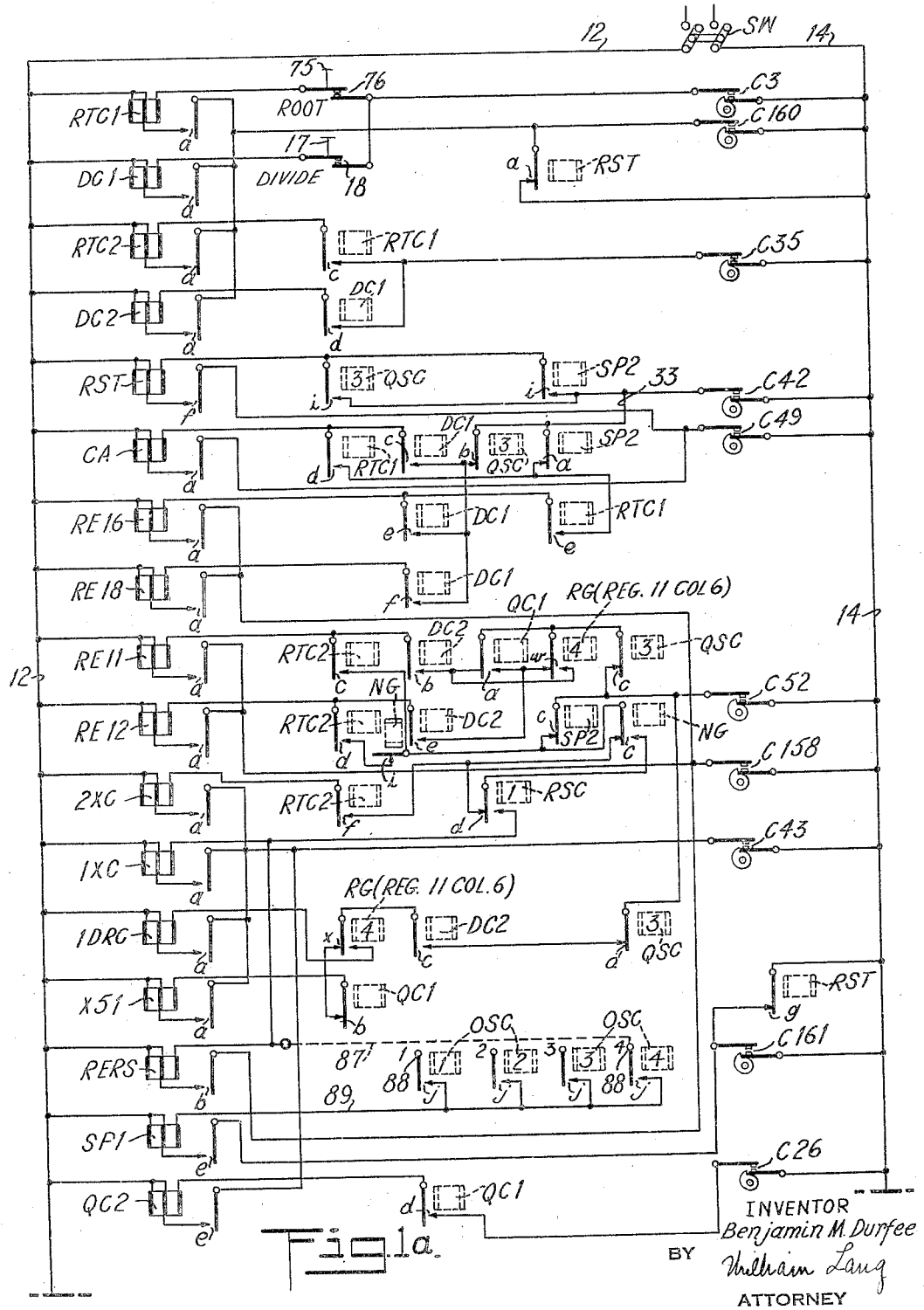
Figure 1H:
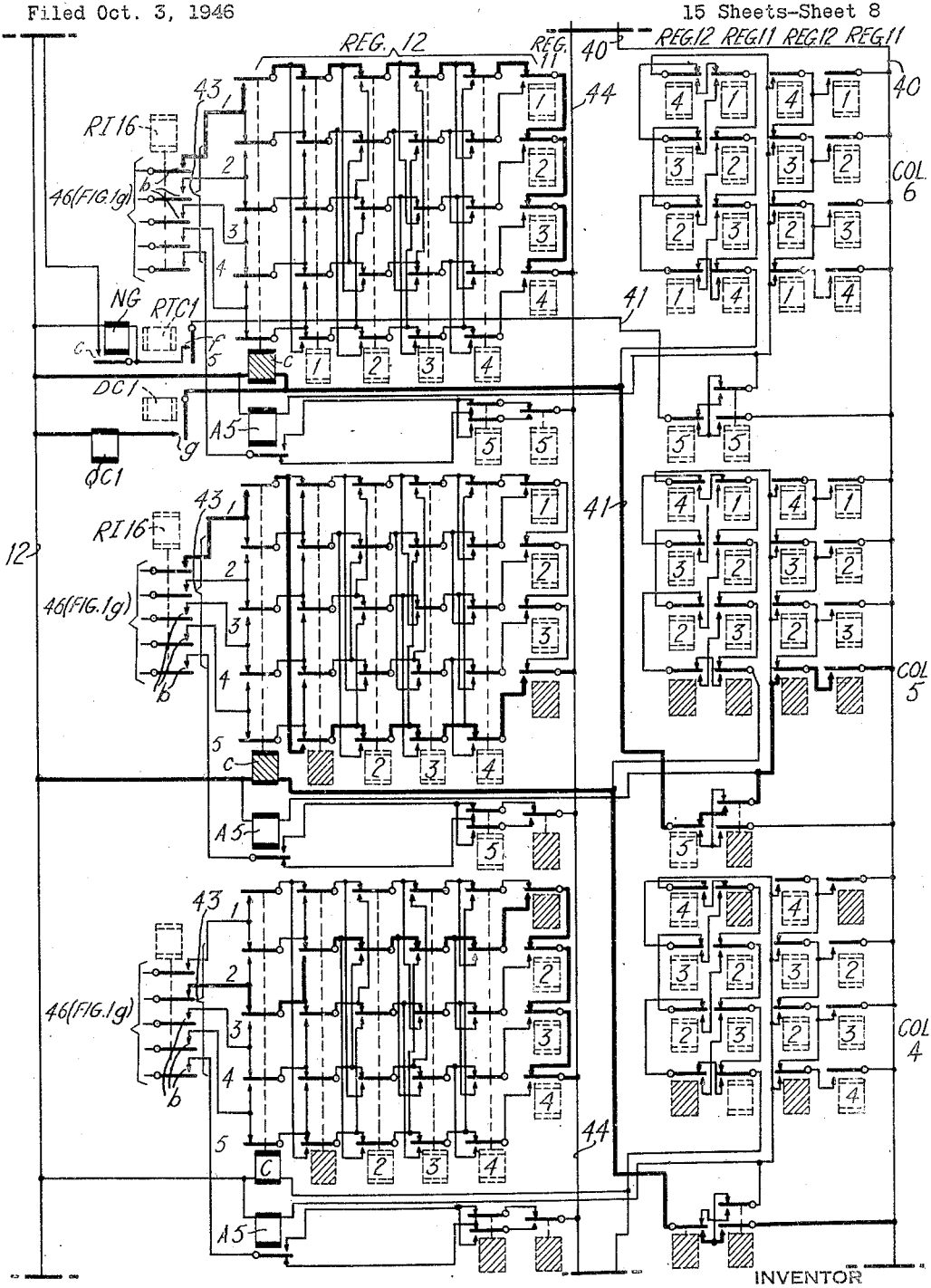

*Test circuits.*—In Figs. 1h and 1i the several contacts controlled by the RG magnets of registers 11 and 12 are shown and suitably identified. These contacts are divided into vertical sections with those to the right constituting what may be termed "carry determining circuits" and those to the left constituting the cross adding network for summing up the two amounts set up.

Referring now to Fig. 1a, the cross add magnet designed CA will be energized at sequence or period 5, through a circuit traceable from line 14, contacts C42, wire 33, b contacts of 3 magnet QSC, c contacts of magnet DC1 (now closed), and magnet CA to line 12. This magnet closes its a contacts to provide a holding circuit through cam contacts C49 so that it remains energized for the period indicated in Fig. 3. In Fig. 1g (bottom), this magnet closes contacts b so that, when cam contacts C50 in series therewith close, a test circuit will be completed through a wire 40 (Fig. 1h) to the carry determining contacts of the 11 and 12 registers. If the adding of the amounts in registers 11 and 12 would result in a tens carry into the highest order, a magnet designated QC1 (Fig. 1h) would be energized.

For the example under consideration, this carry condition is not present so that the closure of contacts C50 at this time is ineffective and magnet QC1 will not be energized. This magnet controls the effectiveness of the cross adding circuits, and these also accordingly will not be effective at this time, so that explanation thereof will be deferred until a later point in the solution of the problem.

There is now present a condition identified as condition D referred to hereinabove, wherein the complement of 5 times the divisor stands in register 11 and a "no go" condition is present, so that there is now to follow resetting of register 11 and entry of 1 times the divisor into such register. There will also be an incidental idle resetting operation of register 16.

Referring to Fig. 1a, a circuit is completed upon closure of contacts C35 at sequence 6, which is traceable from line 14, contacts C35, d contacts of magnet DC1 (now closed), and magnet DC2 to line 12. This magnet closes its a contacts to provide a holding circuit through a contacts of magnet RST and also through contacts C160, so that it remains energized from this point along with magnet DC1.

*Reset circuits for registers 16 and 18.*—When contacts C42 close, a circuit is traceable from line 14, contacts C42, wire 33, b contacts of 3 magnet QSC, thence in parallel through e and f contacts of magnet DC1 (now closed), to magnets RE16 and RE18 to line 12. These two magnets control resetting of registers 16 and 18 and, since they contain no entries at this time, this is an idle operation. They close *a* contacts to provide holding circuits through contacts C158.

*Resetting circuits for register 11.*—At the 7 sequence time a circuit is completed in Fig. 1*a* from line 14, contacts C52, *c* contacts of 3 magnet QSC, *a* contacts of magnet QC1, *b* contacts of magnet DC2 now closed, magnet RE11 to line 12. This magnet closes its *a* contacts to provide a holding circuit through contacts C158.

In Fig. 1*e*, magnet RE11 opens its *b* contacts to break the holding circuits of the RG magnets in register 11, so that they become deenergized upon opening of cam contacts C149.

*Entering the complement of 1 times the divisor in register 11.*—At the 7 sequence time, a point before register 11 is cleared, the circuit is completed from line 14 (Fig. 1*a*), contacts C52, *d* contacts of 3 magnet QSC, *c* contacts of magnet DC2, *x* contacts of magnet RG which represents the value 4 in column 6 of register 11 (which is now energized) so that the circuit continues to magnet 1DRC and line 12. This magnet closes its *a* contacts to provide a holding circuit through contacts C43, so that it holds for the period indicated in Fig. 3.

Referring to Fig. 1*b*, at sequence 8 contacts C33 again close and a circuit is traceable from line 14, contacts C33, wire 19, *a* contacts of 3 magnet QSC, *a* contacts of 3 magnet QS, *d* contacts of magnet DC2 (closed), *a* contacts of magnet designated X51, *b* contacts of magnet 1DRC, to magnet 1DR and line 12. Magnet 1DR closes its *a* contacts to provide a holding circuit through wire 20 and contacts C24.

Referring now to Fig. 1*e*, magnet 1DR closes three sets of *b* contacts shown in the center of the figure and three additional *c* contacts at the left. Now when contacts C26 close at the 9 time, a circuit is completed from line 14, through contacts C26, wire 21, *c* contacts of magnet 1DR to wire 35, from which it extends in column 4 of register 9, through the *d* contacts in the 5 and 1 positions, through *b* contacts of magnet 1DR to the 5 and 1 wires 24 associated with column 4 of register 11, thence through the 5 and 1 magnets RG in this column to line 12, to thereby enter a 6. A parallel circuit extends from wire 35, the *d* contacts of column 3 of register 9 in position 4, through a pair of *b* contacts of magnet 1DR to the 4 wire 24 related to column 3 of register 11 to energize the 4 magnet in this column. Similarly, for column 2 of register 9 a circuit extends from wire 35, through the *d* contacts in position 3, to a pair of *b* contacts of magnet 1DR to the 3 wire of the group 24 related to column 2 of register 11, thereby energizing the 3 magnet RG in this column. In column 1 of register 9, the contacts *d* in the 4 and 5 positions are closed, so that circuits similar to those already traced will extend to the 4 and 5 wires of the group 24 related to column 1 in register 11 to energize the RG magnets 4 and 5 in this column.

Concurrently, there is a circuit traceable from line 14, through contacts C26 and wire 21 which extends through the right hand *c* contacts of magnet 1DR to the two *c* contacts to the left thereof, and to the 4 and 5 wires 24 related to column 5 of register 11 to energize the 4 and 5 RG magnets in this order. In this manner amount 96439 is entered in register 11 as indicated in line 9 of Fig. 2.

From Fig. 3 it will be noted that magnet CA was deenergized at the 8 point in the cycle, and now at the 9 point when the divisor is being entered into register 11 magnet CA is again energized (Fig. 1*a*) when contacts C42 close, through the circuit already traced, which it will be observed also branches through the *e* and *f* contacts of magnet DC1 to energize the reset magnets RE16 and RE18 which is again an idle operation.

*Comparison test circuit at sequence point 10.*—Referring to Figs. 1*h* and 1*i*, there is shown a circuit network controlled by the register magnets RG of the 11 and 12 registers arranged in columns and rows divided into a right hand section including four columns of magnets, which determine tens carry conditions between orders, and a left hand section which obtains the algebraic sum of the two values set up in the pair of registers. The manner of operation will be apparent by considering the specific example chosen for illustration, for which the magnets RG for register 11 are set up for the value 96439, and the magnets for register 12 are set up in accordance with the value 16376. To facilitate the explanation, the RG magnets involved are cross hatched and the circuits controlled through the contacts thereof are emphasized.

The magnet CA will have closed its *b* contacts (Fig. 1*g*) so that upon closure of contacts C50 the test circuit will be completed and this is traceable as follows: from line 14, contacts C50, *b* contacts of magnet CA, wire 40 (Fig. 1*h*) to the contacts of the RG magnets in column or order 5. From here a circuit extends through the contacts of the 4 magnet RG of register 11, contacts of the 1 magnet RG of register 12, a pair of contacts of the 5 magnet of register 11 (shifted), contacts of the 5 magnet of register 12 (normal), wire 41, *g* contacts of magnet DC1 closed, relay magnet QC1 to line 12. The circuit also branches to carry magnet C related to column 6. Briefly, then, the setting of a 9 in column 5 of register 11 and the setting of a 1 in the same column of register 12 call for a tens carry and effect the establishment of the circuit traced to energize the test magnet QC1, which will control the operation of the cross adding circuits.

Magnet QC1 shifts a pair of contacts *d* in Fig. 1*a* (bottom) to complete a circuit from line 14, contacts C26, *d* contacts of magnet QC1, and magnet QC2 to line 12. Magnet QC2 holds through its *e* contacts and contacts C43. This magnet closes a pair of *a* contacts (bottom of Fig. 1*g*), so that when contacts C52 close cross adding circuits will be completed.

Before tracing the circuits involved, a brief explanation will be made of the general arrangement, which is similar to that shown and described in copending application Serial No. 636,526, filed December 21, 1945, now Patent No. 2,490,362.

In order to explain the principle of operation of the cross adding circuits for one denominational order, the contacts set up by the register magnets RG are separated into groups enclosed in rectangles designated A, B, C, D (Fig. 1*i*), column 1. In section A are contacts set to represent digits 1 to 4 of both registers and, whenever the sum of the two digits represents 5, a circuit is completed through this section from wire 40, to energize a magnet designated A5 in the same denominational order. A circuit will also be completed through section A whenever the sum of the digits set therein totals 6, 7 or 8. Thus, relay A5 will also be energized by a circuit through section A whenever the sum of the digits is 5–8 inclusive. In section C are contacts set up to represent a 5 entry in each of the two registers. If one of the digits represented in this section is set up and the setting in section A is also set up to represent the digits from 5 to 8, the circuit to magnet A5 will branch through section C and the wire 41 to the carry magnet C in the next higher order or column.

If a 5 is set up for both registers in section C, magnet C will not be energized through the contacts in section A. Under such conditions, magnet 2C will be energized through a circuit extending around the contacts of section A and directly through the contacts in section C. If the sum of the digits represented in sections A and C is less than 5, the magnets A5 and C will not be energized through the contacts of these sections. Thus, generally speaking, the contacts in sections A and C might be called carry determining contacts in that, if the sum of the two digits set up aggregates 10 or more, both magnets A5 and C will be energized and, if they aggregate 5 to 8 inclusive, magnet A5 will be energized.

In section B the contacts are set to represent the code values 1 to 4 in the two registers where, for example, contacts of magnets 1 to 4 are set to represent digits 1 to 4 or digits 6 to 9. These contacts function for carry-on-carry conditions wherein a circuit from a lower order branches from the tens carry wire 41, through a wire 42 to contacts in the B section in the next higher order. If the setting of such higher order contacts represents 4 only or the sum of 4, a circuit will extend therethrough to the A5 magnet in such higher order. If such higher order has its section C contacts set to represent 5 for either register, the circuit will also branch through section C to energize carry magnet C in the next higher order, and this in turn will branch through its related wire 42 to the next order. Inspection will show that, if the contacts in section B are set to complete a circuit therethrough, the contacts in section A will not be in condition to complete a circuit.

The group of contacts enclosed in a rectangle or section D are set by register magnets RG wired in accordance with the table of addition for the digits 1 to 4 with 5's cast out, of the two registers. In section E the contacts are set to represent the values 5 for the two registers, and these contacts are wired in accordance with the sum of 5 in both registers or a 5 in one or the other. Circuits through section E are connected to contacts of magnet A5 which preset in accordance with conditions prevailing in sections A and D so that, if there is only one setting of 5 in section E and magnet A5 is not energized, there will be a circuit completed through section E and the *a* contacts of the magnet A5 to the the 5 wire of a group of wires 43. If magnet A5 is energized, indicating that the sum of the two digits is 5 or more and one of the sets of contacts in section E is also set, a circuit will not be completed to the 5 wire 43. Also, if both sets of contacts in section E are set at 5 as well as the *a* contacts of magnet A5, a circuit will be completed to the 5 wire 43 to cause a 5 to be read out of this order as will be presently explained.

Just to the left of section D is a set of contacts which are shifted when a carry is called for by the next lower order. These contacts are wired in the adding chain extended through the contacts in section D, so that the circuit connections are shifted one digit higher through the carry contacts and the sum of the two digits set in any order will be transmitted to wires 43.

To summarize the foregoing, let us consider a pair of specific digits set up on the units or column 1 order of registers 11 and 12, namely, the digits 9 and 6, respectively, of the specific problem. The circuits are emphasized so that their tracing may be facilitated. It will be noted that a circuit extends from wire 40 to the A5 magnet. A second circuit extends from wire 40, through section C and the tens carry wire 41 to the carry magnet C in the higher order. When contacts C52 (Fig. 1g) close, a circuit is completed from line 14, contacts C52, *c* contacts of magnet CA, *a* contacts of magnet QC2, *a* contacts of magnet designated RTC2, to wire 44 (Fig. 1h) which extends down to column 1 (Fig. 1i) and from here a circuit extends through section D through a pair of contacts of magnet C (which is energized to add a fugitive 1 as will be explained), to the 1 wire 43.

From wire 44 a second circuit extends through section E and *a* contacts of magnet A5 to the 5 wire 43, so that in this column the value 6 will be read out. In the other orders, circuits will similarly be completed for the example through the emphasized circuits. In Fig. 1i (bottom) magnet DC1 closes a pair of *n* contacts so that, when current is directed to wire 40, a circuit extends through contacts *n* of magnet DC1 to energize the carry magnet C in column 1 and thereby add the fugitive 1 in this column. The addition of this 1 is indicated on line 10 of Fig. 2.

*Entering the cross addition in register 16.*—Referring to Fig. 1g, when contacts C35 close at the 10 point in the cycle, a circuit is completed from line 14, contacts C35, *e* contacts of the 3 magnet QSC, a pair of *h* contacts of magnet DC1 now closed, magnet RI16 to line 12. Magnet RI16 will close its *a* contacts to provide a holding circuit through contact C24. In Figs. 1h and 1i, magnet RI16 closes sets of *b* contacts connected to the wires 43 and the readout circuits now extend to groups of wires designated 46 which in Fig. 1g extend to the RG magnets of register 16 to enter therein the value 112816. The energized RG magnets close their *a* contacts to provide a holding circuit through the *c* contacts of magnet RE16 and cam contacts C149.

*Resetting register 12.*—At the 11 point in the cycle when contacts C52 close (Fig. 1a), a circuit is traceable from line 14, contacts C52, *c* contacts of 3 magnet QSC, *a* contacts of magnet QC1 (now shifted), a pair of *e* contacts of magnet DC2 (closed), magnet RE12 to line 12. This circuit is held through *a* contacts of the magnet and cam contacts C158. In Fig. 1f magnet RE12 opens its *b* contacts to reset register 12 when contacts C149 open at the end of the 11 point in the cycle.

*Transfer from register 16 to register 12.*—At the 12 point in the cycle, a circuit will be completed from line 14 (Fig. 1b), through contacts C33, wire 19, *a* contacts of 3 magnet QSC, *b* contacts of magnet QC2 (now shifted), *b* contacts of magnet X51, *f* contacts of magnet DC2 and magnet RO16 to line 12. The holding circuit for the magnet is traceable through wire 20 and cam contacts C24.

In Fig. 1f magnet RO16 closes its *c* contacts so that when contacts C26 close, circuits are completed from line 14, contacts C26, *c* contacts of magnet RO16, wire 48, and thence through contacts *d* of the RG magnets of register 16 (set to represent 112816) to the RG magnets of register 12 and line 12. In this manner the setting in register 16 is transferred to register 12 where it will be held until magnet RE12 is again energized.

*Resetting register 16.*—At the 13 point in the cycle, when contacts C42 close (Fig. 1a), a circuit is traceable from line 14, contacts C42, wire 33, b contacts of magnet QSC, e contacts of magnet DC1 and magnet RE16 to line 12. In Fig. 1g magnet RE16 opens its c contacts so that, when cam contact C149 opens, the RG magnets of register 16 will all be deenergized.

*Sequence 14 to 17.*—The operations during this sequence are a repetition of the operations as explained for sequence 10 to 13, that is, the test impulse through contacts C50 (Fig. 1h) finds a "go" condition which energizes magnet QC1 and the C magnet in the highest order of the cross adding registers 11, 12. Thereafter, the impulse from contacts C52 effects the cross adding into register 16, register 12 is reset and the amount 209256 is transferred to register 12, followed by resetting of register 16. The new dividend values 9256 and the quotient digit 2 are now standing in register 12 ready for comparison with the amount 96439 in register 11.

*Sequence 18 to 21.*—The test, cross add, transfer and reset operations again repeat to obtain 305696 in register 12.

*Sequence 22 to 25.*—The test, cross add, transfer and reset operations repeat a fourth time resulting in entry of the amount 402136 in register 12.

*Sequence 26.*—At this point, when contacts C50 close, a "no go" condition is found, so that magnet QC1 is not energized. When contacts C35 (Fig. 1g) close, there will now be a circuit completed from line 14, contacts C35, e contacts of 3 magnet QSC and h and i contacts of the magnet DC1 and magnet RI18 to line 12. This magnet will hold through its a contacts and cam contacts C24 for the period indicated in Fig. 3. Later, when contacts C26 close, there will be a circuit completed from line 14, contacts C26, e contacts of magnet QC1, y contacts of the 4 RG magnet related to the highest order register 11, b contacts of magnet RI18, wire 49 and thence through contacts d of the RG magnets of register 12 (set to represent 402136) to the RG magnets of register 18 and to line 12. The holding circuit is through c contacts of magnet RE18.

*Reset registers 11 and 12.*—Referring to Fig. 1a when contacts C52 now close, there is a circuit traceable from line 14, contacts C52, c contacts of magnet QSC, a contacts of magnet QC1, b contacts of magnet DC2 and magnet RE11 to line 12. A parallel circuit extends from line 14, contacts C52, c contacts of magnet QSC, w contacts of 4 magnet RG related to column 6 of register 11, e contacts of magnet DC2 and magnet RE12 to line 12. Both these magnets now hold through their a contacts and cam contacts C158.

*Pickup of QSC and X51 magnets.*—During sequence 27 there is a circuit completed (Fig. 1a) traceable from line 14, contacts C52, d contacts of 3 magnet QSC, c contacts of magnet DC2, x contacts of 4 magnet RG (related to column 6 of register 11), b contacts of magnet QC1 and magnet X51 to line 12. This magnet will hold through contacts C43 for the period indicated in Fig. 3.

In Fig. 1d, there is also completed a circuit traceable from line 14, contacts C39, f contacts of 3 magnet QSC, g contacts of magnet DC2, b contacts of 4 magnet RG, f contacts of magnet QC1, a plug connection 50, g contacts of 2 magnet QSC, 2 magnet QS to line 12. The circuit will hold through b contacts of 2 magnet QS and contacts C164. Plug connection 50 is made to sockets 51 in accordance with the number of quotient digits it is desired to obtain. In the present case the connection 50 is made to the 2 socket 51 for a 2-place quotient and it is apparent that if made to the 1 socket, the 1 magnet QS would have been energized instead of the 2 magnet QS.

In Fig. 1b (bottom), the 2 magnet QS closes its c contacts and, when cam contacts C33 close, a circuit is completed from line 14, contacts C33, a contacts of 3 magnet QSC, wire 52, c contacts of 2 magnet QS, and 2 magnet QSC to line 12. Closure of its h contacts will set up a holding circuit through e contacts of restart magnet RST which will hold until the end of the dividing operation.

*Transfer from register 18 to registers 12 and 17.*—In Fig. 1b, a circuit is completed at sequence 28, traceable from line 14, contacts C33, wire 19, a contacts of 3 magnet QSC, b contacts of magnet QC2, h contacts of magnet DC2, c contacts of magnet IDRC and magnet RO18 to line 12. The holding circuit is through contacts C24. In Fig. 1f (bottom), magnet RO18 closes its b contacts so that, when contacts C26 close, a circuit is traceable from line 14, contacts C26, b contacts of magnet RO18, wire 53, b contacts of the RG magnets of register 18, in columns 1 to 5 thereof, and groups of wires 54 to RG magnets of register 12 and line 12. It is to be noted that the sets of wires 54 extend from each order of register 18 to the next higher order in register 12 to thereby effect a column shift of one step as represented on line 28 of Fig. 2.

At the same time, a circuit extends from wire 53 to the b contacts of magnets RG in column 6 of register 18 through a set of wires 55, d contacts of 2 magnet QS (now closed), RG magnets of register 17 in column 2 thereof to line 12. The a contacts of these magnets will hold through wire 56 to line 14.

*Entering the complement of 5 times the divisor.*—At sequence 28 a circuit is traceable (Fig. 1b) from line 14, contacts C33, a contacts of 3 magnet QSC, a contacts of 3 magnet QS, d contacts of magnet DC2, a contacts of magnet X51 (now shifted), magnet 5DR to line 12. Magnet 5DR shifts its b, c and d contacts (Fig. 1e) as before so that, when contacts C26 close at sequence 29, the complement of 5 times the divisor with a 4 in the highest order (482199) is entered into register 11.

*Resetting register 18.*—At sequence 29 when contacts C42 (Fig. 1a) close magnet RE18 is energized through b contacts of 3 magnet QSC and f contacts of magnet DC1.

*Sequence 30 to 33.*—At sequence 30 the test indicates a "go" condition so that cross addition takes place to enter 503560 into register 16 through circuits already traced, registers 11 and 12 are reset and transfer is effected from register 16 to register 12. At sequence 31, before register 11 is reset, magnet IDRC is energized as explained for sequence 7 and a point later magnet IDR is energized to condition the circuits for entry of the divisor complement into register 11 after this register has been cleared of the prior entry.

*Sequence 34 to 37.*—The operations in this series of sequences is the same as for sequence 10 to 13 resulting in entry of cross addition 600000 into register 16 and its transfer to register 12.

*Sequence 38.*—The test at this point finds a "no go" condition which results in a transfer from register 12 to register 18 and now, when contacts C39 (Fig. 1d) close, a circuit through f contacts of 3 magnet QSC, g contacts of magnet DC2, b contacts of 4 magnet RG, f contacts of magnet QC1 and connection 50, goes through g contacts of the 2 magnet QSC (now shifted), g contacts of the 3 magnet QSC to the 3 magnet QS and line 12. In Fig. 1b, the succeeding circuit to wire 52 goes through the c contacts of the 3 magnet QS to energize the 3 magnet QSC which now holds to the end of dividing.

Energization of the 3 magnet QSC opens its a contacts (Fig. 1b) so that the pickup circuit for magnet RO18 is from line 14, contacts C33, wire 19, a contacts of 3 magnet QS (now shifted), b contacts of magnet QC2, h contacts of magnet DC2, c contacts of magnet IDRC and magnet RO18 to line 12. As a result, the usual transfer from register 18 to registers 12 and 17 takes place.

In Fig. 1f the quotient digit 6 in column 6 of register 18 is transferred through wires 55 and the d contacts of the 3 magnet QS (now closed) to the RG magnets in column 1 of register 17.

3 magnet QSC opens its b contacts (Fig. 1a) so that magnets RE16 and RE18 are not energized when contacts C42 next close at sequence 43, and the register 18 accordingly retains the setting 600000.

3 magnet QSC also opens its c contacts (Fig. 1a) so that magnets RE11 and RE12 are also not energized when contacts C52 close at sequence 43, and register 12 will therefore retain the setting 00000 representing the remainder of the calculation.

At sequence 41 a circuit is completed from line 14 (Fig. 1a), contacts C42, i contacts of 3 magnet QCS, and restart magnet RST to line 12. Magnet RST holds through its f contacts and cam contacts C49. It opens its a contacts to drop out magnets DC1 and DC2 under control of contacts C160. It opens its e contacts (Fig. 1b) to drop out the QSC magnets. When contacts C161 open, all further operations cease even though the cam contacts continue operation.

Thus, dividing operations, upon initiation continue through a succession of sets of four impulses until a predetermined number of quotient digits have been obtained and then cease leaving registers 9, 12, 18 and 17 containing entries therein. When it is desired to reset these, the main switch SW (Fig. 1a) is opened to interrupt the current supply to their holding circuits.

*Result readout.*—In Fig. 1g is shown the readout wiring of one order of a register and it will be understood that as many may be provided for as desired. The register order magnets RG control contacts h in accordance with the digital value standing therein. If switch SW2 is closed, a circuit will extend through the contacts to one of a set of lamps 65 to indicate visually the digit set up.

*Square root extraction*

Calculation of the square root of a number as carried out in the machine involves the method of successively subtracting (by complementary addition) the terms of the series of differences of squares which are the odd numbers 1, 3, 5, 7, 9, 11, 13, 15, 17, 19, 21, 23, 25, 27, 29, 31, 33, 35, 37, 39, etc. The process is accelerated by grouping the terms in sets of five as 1, 3, 5, 7, 9, whose sum is 25 and initially testing to ascertain whether this sum goes or does not go into the highest portion of the amount whose root is sought. If it does not go, then the separate terms are successively subtracted and a 1 is accumulated for each going term. If it does go, a 5 is accumulated and the next succeeding terms are successively subtracted with a 1 accumulated for each going term until a "no go" condition is reached. When a term does not go, the amount next subtracted represents the sum of five higher terms, which sum represents 100 times the first root digit obtained plus 25. If this goes, then the next succeeding term is subtracted. If it does not go, then the first term of the last sum is subtracted.

The manner in which the procedure is carried out for a typical problem is illustrated in Figs. 4a and 4b which will first be explained before following the procedure in connection with the circuit diagram.

The problem involves finding the square root of 402865 which, within the selected capacity of the machine, is 6347 with a remainder of 21. Four registers 12, 11, 16 and a root register 20 are involved with columnar or denominational capacities as indicated by numerals at the head of the several register columns (Fig. 4a).

The amount 402865 is set up manually as a 9's complement in register 12 in the same manner as explained in connection with dividing and the first step in the automatic procedure enters 25 (line 5) in the two highest orders of register 11. This 25 represents the sum of the first five terms in the difference series, i. e., 1, 3, 5, 7, 9, and a test is made as indicated on line 6 to ascertain whether 25 goes or does not go into 40. This test is effected in the same manner as for division and, since a "go" indication obtains, cross adding results to enter the sum 847134 into register 16 and concurrently the root digit 5 is entered into column 4 of the root register 20.

Thereafter, registers 11 and 12 are reset and the amount 847134 transferred to register 12. On line 9, register 16 is reset and the next term 11 is entered in register 11. A test indicates a "go" condition so that the cross-add operation is repeated and a 1 added to the 5 in register 20 to indicate that the square of 6 (the sum of the terms 1, 3, 5, 7, 9, 11) goes into the value 40 in columns 5 and 6 of register 12. Again there is a reset of registers 11 and 12 and transfer of the remainder 957134 to register 12, followed by reset of register 16 and entry of the next term 13 into register 11.

The terms 11 and 13 are obtained under control of register 20 which is provided with what may be called a doubling-plus-1 readout. Thus, with a 5 in register 20 the readout obtains 2 times 5, plus 1, which is 11 and enters it in register 11. Later, with a 6 in register 20, the readout obtains 2 times 6, plus 1, which is 13 and enters it. This condition, it may be noted, prevails between any two adjacent terms in the series, i. e., any root when doubled and a 1 added thereto will produce the term related to the next higher root. In other words, this term when added to all lower terms in the series gives the square of the next higher root. Thus, as an illustration, a root 9 doubled and a 1 added thereto produces 19. This 19, when added to 1, 3, 5, 7, 9, 11, 13, 15, 17, gives 100 which is the square of 10, the next higher root.

In Fig. 4a, line 14 indicates a "no go" condition with 13 in register 11. As a result, this register is reset and the value 0625 is entered in the same register 11. This value is 100 times the 6 digit of the root already obtained plus 25 and tests whether the root 65 will go or not. It is obtained by entering the 6 from the root register into column 5 of register 11 and entering 25 in the adjacent orders. Line 18 indicates that the root 65 does not go, so register 11 is reset and the value 0121 necessary to test for root 61 is entered. This again, it is to be noted, is obtained by doubling 6 (which now represents 60) and adding 1 to obtain 121; that is, 121 added to all preceding terms 1, 3, 5, 7, etc. results in 3721, the square of 61.

Line 22 indicates that there is now a "go" condition causing cross adding, resetting and transfer with a 1 added in register 20. The next term 123 is entered and again the test results in a "go" condition followed by entry of 125 and then 127 as noted on line 33.

Line 34 indicates a "no go" condition, whereupon after register 11 is reset 6325 is entered with column shift, the 63 being derived from the root register 20 with a 25 to the right to test for the square of 635. It does not go as indicated on line 38 so register 11 is reset and 1261 is entered to test for the square of 631.

Successive "go" conditions result in successive subtraction of 1261, 1263, 1265 and 1267 to obtain the root 634 (Fig. 4b).

As indicated on line 57, the next value 1269 is entered and at the following test period a "no go" condition results whereupon register 11 is reset and the cross adding and transfer operations are suppressed. The next operation as indicated on line 61 is to enter the value 63425 where the 25 is beyond the capacity of the 6 place register 11, but it is indicated how it is handled with more places in the register.

The "go" condition (line 62) results in cross adding, resetting, and transfer and the entering of the next succeeding odd number 12691, which also goes as well as the next number 12693 to obtain the root 6347.

The next value 12695 does not go (line 74) so that, with four places being the extent to which the process is carried out in the example, the result is a root of 6347 with the complementary remainder 7809.

As for dividing, the calculation proceeds on the "four impulse" basis and at each test period one of four conditions may obtain as follows:

A. "Go" condition with a single odd number in register 11.
B. "Go" condition with the sum of five odd numbers in register 11.
C. "No Go" condition with a single odd number in register 11.
D. "No Go" condition with the sum of five odd numbers in register 11.

These four conditions are exemplified, respectively, at lines 10, 6, 14 and 18, and for each condition the succeeding reset, transfer and entering operations will occur as summarized in the following:

*For condition A*

1. Cross add into register 16, add 1 in register 20.
2. Reset registers 11 and 12.
3. Transfer from register 16 to register 12.
4. Enter the next odd number, reset register 16.

*For condition B*

1. Cross add into register 16, add 5 in register 20.
2. Reset registers 11 and 12.
3. Transfer from register 16 to register 12.
4. Enter the next odd number, reset register 16.

*For condition C*

1. No cross adding.
2. Reset register 11.
3. No transferring.
4. Enter 100 times the root increment plus 25.

*For condition D*

1. No cross adding.
2. Reset register 11.
3. No transferring.
4. Enter 20 times the root increment plus 1.

The specific manner in which the foregoing operations are carried out by the mechanism will now be explained with reference to the circuit diagram (Figs. 1a to 1i).

Switch SW (Fig. 1a) is first closed as before, and the complement amount 402865 is manually entered in register 12 as explained for dividing under the heading "Manual entering of the dividend in register 12".

Rotation of the contact operating cams is also initiated as before.

To commence operation, the root start key 75 (Fig. 1a) is operated to close contacts 76. These are held closed momentarily so that, when contacts C3 close at the 3 point in the cycle, a circuit is completed to energize the root control magnet designated RTC1, and through its a contacts this magnet will hold through a contacts of magnet RST.

At the 4 time in the cycle, a circuit is completed from line 14 (Fig. 1b), contacts C33, a contacts of magnet SP1, b contacts of magnet RTC1 (now closed), a contacts of 1 magnet OSC (odd shift control) and 1 magnet OS (odd shift) to line 12. This magnet closes its a contacts to provide a holding circuit through wire 20 and contacts C24 (see Fig. 5). Its energization will prepare circuits for entering 25 into register 11.

*Entering 25 in register 11.*—Referring to Fig. 1d, at sequence 5, a circuit is completed from line 14, contacts C26, wire 77, b contacts of the 1 magnet OS (now closed), a wire 78 (Fig. 1e) extending to the 2 magnet RG in column 6 of register 11, and in parallel through a wire 79, to the 5 wire 24 extending to the 5 magnet RG in column 5 of register 11. This 25 is initially entered in columns 5 and 6 of the register 11 and will be held as before through contacts b of magnet RE11.

Also at sequence 5, a circuit is completed from line 14 (Fig. 1c), contacts C42, c and d contacts of 1 magnet OS (now closed) to energize the 1 magnet OSC which closes its b contacts to hold through c contacts of magnet RST until the end of the calculation.

The cross add magnet CA (Fig. 1a) is energized through a circuit from line 14, contacts C42, wire 33, a contacts of magnet SP2, d contacts of magnet RTC1, magnet CA to line 12. In parallel there is also an idle energization of magnet RE16 from line 14, wire 33, a contacts of magnet SP2, e contacts of magnet RTC1, to magnet RE16 and line 12.

*Test circuits.*—When contacts C50 close (Fig. 1g) to test the carry circuits, there will be no circuit completed since for the example chosen there is no tens carry from the highest order. When such carry is present there is a circuit from contacts C50, b contacts of magnet CA, wire 40 (Fig. 1h) and thence through the contacts of the RG magnets to ultimately extend to the wire 41 leading out of the highest or 6 order, and then through f contacts of magnet RTC1 and a "no go" magnet NG to line 12. Magnet NG closes a pair of c contacts to provide a holding circuit through a cam contacts C43.

*Cross adding into register 16.*—As stated, there is a "go" condition present so that magnet NG is not energized. In Fig. 1a, when contacts C35 close at sequence 6, there is a circuit from line 14, c contacts of magnet RTC1 to energize magnet RTC2 which holds through a contacts of magnet RST. Also at the 6 sequence there is a circuit from line 14 (Fig. 1g), contacts C35, b contacts of magnet SP2, g contacts of magnet RTC1 and magnet RI16 to line 12, holding through contacts C24.

Accordingly, in Fig. 1g, when contacts C52 now close there is a circuit from line 14, contacts C52, c contacts of magnet CA, h contacts of magnet DC2, a contacts of magnet NG, to wire 44 (Fig. 1h), from which in the familiar manner circuits branch through the D and E sections in the several cross adding columns of registers 11 and 12 to groups of wires 43 in representation of the sum 847134. The circuits continue through the b contacts of magnet RI16 (now closed) to wires 46 (Fig. 1g) to the RG magnets of register 16 to enter this amount therein.

*Entering the root digit 5.*—In Fig. 1c, there is a circuit from line 14, contacts C52, b contacts of magnet RTC2, b contacts of magnet SP1, b contacts of magnet NG, b contacts of 1 magnet RSC, (root shift control), uppermost b contacts of 3, 2 and 1 magnets CS (root shift) to the 5 magnet RG in column 4 of register 20. This magnet closes its a contacts to provide a holding circuit through a contacts of magnet RE20.

*Reset registers 11 and 12.*—At sequence 7, there is a circuit completed from line 14 (Fig. 1a), contacts C52, c contacts of magnet SP2, c contacts of magnet RTC2, to magnet RE11. A parallel circuit extends from line 14, contacts C52, c contacts of magnet SP2, i contacts of magnet NG, d contacts of magnet RTC2, and magnet RE12. The holding circuits of RE11 and RE12 are as for dividing.

*Transfer from register 16 to register 12.*—At sequence 8, magnet RO16 is energized through a circuit from line 14 (Fig. 1b), contacts C33, wire 19, c contacts of magnet SP1, d contacts of magnet NG, e contacts of magnet RTC2, and magnet RO16 to line 12. Thus, in Fig. 1f, when contacts C26 close, the familiar circuits are completed to transfer the amount in register 16 to register 12 through wire 48, and the d contacts of magnets RG of register 16.

*Entering the amount 11 in register 12.*—At sequence 7 there was a circuit traceable in Fig. 1a, from line 14, contacts C52, c contacts of magnet SP2, c contacts of magnet NG, f contacts of magnet RTC2, and control magnet 2XC to line 12. This magnet closes its a contacts to hold through contacts C43.

In Fig. 1b, magnet 2XC closes its b contacts, so that a circuit is completed through contacts C33 (at 8 sequence) to a contacts of magnet SP1, b contacts of magnet 2XC and magnet 2X to line 12. It holds through its a contacts and contact C24. A branch extends from a contacts of magnet SP1, through b contacts of magnet RTC1, a contacts of 1 magnet OSC (now shifted), a contacts of 2 magnet OSC, and 2 magnet OS to line 12.

Referring to Fig. 1d, the 2 magnet OS shifts a set of b contacts and a set of f contacts in vertical alignment with the RG contacts related to column 4 of register 20. Just above the f contacts of 2 magnet OS are b contacts related to the 5 RG magnet of column 3, register 20.

Through this contact arrangement, interconnected as shown, the setting of a 5 in column 4 will result in entry of 11 into columns 5 and 6 of register 11. The circuit paths involved and emphasized for facility in tracing are as follows: from line 14, contacts C26, wire 77, right hand contacts of the 5 magnet RG (column 4), sixth d contacts of magnet 2X, right hand b contacts of 2 magnet OS, wire 80 (Fig. 1e), to the 1 magnet RG in column 6 of register 11.

The second circuit is from wire 77, contacts of the 4 magnet RG (column 4), contacts of the 3 magnet RG, contacts of the 2 magnet RG, contacts of the 1 magnet RG, contacts of the 5 magnet RG (column 3), f contacts of the 2 magnet OS, d contacts of the magnet 2X, b contacts of the 2 magnet OS, 1 wire of the group 24 (Fig. 1e), to 1 magnet RG in column 5 of register 11.

This wiring thus constitutes a "2 times plus 1" readout and from inspection it will be seen that for the digits 1, 2, 3, 4, 5, 6, 7, 8 and 9 the amounts 3, 5, 7, 9, 11, 13, 15, 17 and 19 will be read out.

*Reset register 16.*—In Fig. 1a the circuit for magnet RE16 occurring at sequence 9 is from line 14, contacts C42, wire 33, a contacts of magnet SP2 and e contacts of magnet RTC1 to magnet RE16 and line 12.

At the 9 sequence, a circuit is now completed in Fig. 1b from line 14, contacts C42, d contacts of magnet SP2, a contacts of magnet 1X, g contacts of magnet RTC2, a contacts of 1 magnet RSC, and the 1 magnet RS to line 12. This magnet closes its a contacts to hold through contacts C24.

When contacts C35 next close there is a circuit completed from line 14, contacts C35, e contacts of magnet SP2, c contacts of 1 magnet RS, and 1 magnet RSC to line. This magnet closes its b contacts to hold through a contacts of reset magnet RERS and parallel cam contacts C149.

At this point the amount 847134 is standing in register 12, the amount 11 is standing in register 11 and the digit 5 is standing in register 20.

At sequence 10, a second test occurs with a "go" condition as before so that cross adding takes place as before and a 1 is entered in register 6 to advance the root one unit. The circuit involved is traceable in Fig. 1c from line 14, contacts C52, b contacts of magnet RTC2, b contacts of magnet SP1, b contacts of magnet NG, b contacts of 1 magnet RSC (now shifted), b contacts of 2 magnet RSC, b contacts of 3, 2 and 1 magnets CS to the 1 magnet RG in column 4 of register 20, to line 12. It will hold together with the 5 magnet RG previously energized.

Resetting of registers 11 and 12 repeats, as well as the transfer from register 16 to 12 as indicated on lines 11 and 12 of Fig. 4a.

*Entering 13 into register 11.*—At sequence 13, with a 6 standing in column 4 of register 20, contacts C26 (Fig. 1d) will complete the 2 times plus 1 circuits to enter a 1 in column 6 and a 3 in column 5 of register 11. Just prior to this the 2X magnet is energized in the same manner as before together with the 2 magnet OS. Concurrently, register 16 is reset.

*Sequence 13.*—Upon the third test with 957134 in register 12 and 13 in register 11, the circuit initiated by contacts C50 (Fig. 1h) will complete the carry circuit terminating in wire 41 extending out of column 6 to energize magnet NG which closes its c contacts to hold through cam contacts C43.

Magnet NG opens its a contacts (Fig. 1g) to prevent completion of the cross add circuits. It shifts its $i$ contacts (Fig. 1a) so that register 12 does not reset with register 11.

In Fig. 1b the circuit is completed from line 14, contacts C42, $d$ contacts of magnet SP2, $a$ contacts of magnet IX, $g$ contacts of magnet RTC2, $a$ contacts of 1 and 2 magnets RSC to the 2 magnet RS which closes its $c$ contacts so that, when contacts C35 close, 2 magnet RSC will be energized and held along with the 1 magnet RSC (see Fig. 5).

Since the 1 magnet RSC is now held energized, there is a circuit in Fig. 1a traceable from line 14, contacts C52, $c$ contacts of magnet SP2, $c$ contacts of magnet NG (shifted), $d$ contacts of 1 magnet RSC (shifted) to magnet IXC and line 12. Magnet IXC closes its $a$ contacts to hold through contacts C43.

Magnet IXC closes its $b$ contacts (Fig. 1b) to energize magnet IX through a circuit from line 14, contacts C33, $a$ contacts of magnet SP1, $b$ contacts of magnet IXC and magnet IX with a hold back to contacts C24.

In Fig. 1c, the entering into the root register 20 is prevented by the opening of $b$ contacts of magnet NG (now energized) so that register 20 remains standing at 6.

In Fig. 1b, the transfer from register 16 to register 12 is also prevented by the opening of $d$ contacts of magnet NG so that magnet RO16 is not energized.

At sequence 15 a circuit is completed in Fig. 1a traceable from line 14, contacts C52, $c$ contacts of magnet SP2, $c$ contacts of magnet NG (shifted), $d$ contacts of 1 magnet RSC (shifted) and magnet RERS to line. This magnet holds through its $b$ contacts and contacts C158. It opens its $a$ contacts (Fig. 1b) to cause deenergization of 1 and 2 magnets RSC when contacts C149 open.

*Sequence 17.*—Register 12 contains 957134 and register 20 contains 6. The value 0625 is now to be entered into register 11 as a trial root 65. Since the first root digit 6 has been accumulated and stored in the root register 20, a shift of the circuits must now take place and new calculations must be made on the basis of a shift of two columns to the right. Thus, the root 6 now becomes 60, 2 times 60 plus 1 equals 121, the next odd number for obtaining the root 61. The sum of 121, 123, 125, 127 and 129 is 625 and it will be noted that this number is made up of the first root digit 6 followed by 25. Inspection will show that whenever a part of the root is complete, the next trial figure used is made up of the root part already obtained followed by 25. Thus, for part 6 the figure is 625, for part 63 the figure is 6325, for part 634 the figure is 63425 and so on. This enables the utilization of a simple readout from the root register of the amount therein, followed by 25, with appropriate columnar shifting.

Odd shift magnet OS number 2 (Fig. 1b) was reenergized along with magnet IX through a circuit from line 14, contacts C33, $a$ contacts of magnet SP1, $b$ contacts of magnet RTC1, $a$ contacts of 1 magnet OSC (shifted), $a$ contacts of 2 magnet OSC and 2 magnet OS to line 12. In Fig. 1c, 2 magnet OS closed its $d$ contacts to complete a circuit from line 14, contacts C42, $c$ contacts of magnet OS, $b$ contacts of magnet IX, $d$ contacts of 2 magnet OS and 2 magnet OSC to line 12. This magnet is then held through its $b$ contacts and the $c$ contacts of magnet RST until the end of the computation.

The root register column shift control magnet CSC (1) is energized through a circuit for line 14 (Fig. 1c), contacts C33, $d$ contacts of magnet SP1, $c$ contacts of magnet IXC, $e$ contacts of 1 magnet CS and 1 magnet CSC to line 12. This magnet closes at $e$ contacts to hold through contacts C24, and closes its $f$ contacts to energize corresponding magnets CS which in turn holds through its $f$ and $d$ contacts of magnet RST.

Thus, at sequence 17 (see Fig. 5), magnets IX, 2 magnet OS, 1 magnet CS are in energized condition together with the others as indicated in the chart and entry of 625 into register 11 will be effected as follows. In Fig. 1d a circuit is traceable from line 14, contacts C26, wire 77, the left hand pair of contacts of 5 magnet RG (column 4, now shifted), a pair of $d$ contacts of magnet IX, 5 wire of a group 82, $b$ contacts of 2 magnet OS, and 5 wire 24 to 5 magnet RG in column 5 of register 11. A parallel circuit extends from wire 77, through the contacts of RG magnets 4, 3, 2 (normal) and 1 (shifted), left hand pair of $d$ contacts of magnet IX, 1 wire 82, $b$ contacts of 2 magnet OS to the 1 wire 24 to 1 magnet RG in column 5 of register 11. Thus, a 6 is entered in this order.

Magnet IX closes contacts designated $e$, so that a circuit is also completed from wire 77, one of the $e$ contacts of magnet IX and wire 83, $b$ contacts of 2 magnet OS, to the 2 wire of group 24 related to column 4 to enter a 2 in this column of register 11. A circuit extends through the second $e$ contact of magnet IX, through wire 84, a pair of $b$ contacts of 2 magnet OS, to the 5 wire of the group 24 related to column 3 of register 11. In the same manner any other digit standing in column 4 of register 20 would be transferred to column 5 of register 11 and 25 entered into columns 4 and 3.

The odd number shift control magnet OSC numbered 2 will now be energized through a circuit from line 14 (Fig. 1c), contacts C42, $c$ contacts of 1 magnet OS, $b$ contacts of magnet IX (closed), $d$ contacts of 2 magnet OS and 2 magnet OSC to line 12 and this magnet will hold through $c$ contacts of magnet RST to the end of computations.

The root register column shift number 1 magnet CS will also be energized through a circuit from line 14, contacts C42, $f$ contacts of 1 magnet CSC (closed) to the 1 magnet CS and line 12, holding through its $f$ contacts and $d$ contacts of magnet RST.

*Sequence 18.*—The test at this time indicates a "no go" condition D and as a result no cross adding takes place. Register 11 is reset as before and at sequence 21 the odd number 121 is to be entered in place of 625. 3 magnet OS is now energized upon closure of contacts C33 (Fig. 1b) through $a$ contacts of magnet SP1, $b$ contacts of magnet RTC1, $a$ contacts of 1 magnet OSC (shifted), $a$ contacts of 2 magnet OSC (shifted), and 3 magnet OS to line 12.

Now in Fig. 1d with the magnet 2X and the 3 magnet OS energized (sequence 21), circuits are completed to enter 121 as follows: from line 14, contacts C26, wire 77, right hand contacts of 5 magnet RG (column 4), $d$ contacts of magnet 2X, a pair of $b$ contacts of 3 magnet OS to the 1 wire of group 24 related to column 5 of register 11, to the 1 magnet RG in such order; also, from wire 77 to contacts of 1 magnet RG (column 4), as already traced, $b$ contacts of 5 magnet RG (column 3 normal), $f$ contacts of 2 magnet OS (normal), $d$ contacts of magnet 2X to the 2 wire 82 and thence through $b$ contacts of 3 magnet OS to the 2 wire 24 related to column 4 of register 11 and to the 2 magnet RG in such order. The third circuit is traceable from wire 77, to the contacts of the 4 magnet RG of column 3, thence through the contacts of magnets 3, 2 and 1 RG of column 3, down through the b contacts of 5 magnet RG related to column 2, f contacts of 3 magnet OS (now closed), d contacts of magnet 2X, a pair of b contacts of 3 magnet OS (now closed) to the 1 wire of group 24 related to column 3 of register 11 and thence to the 1 magnet RG in such column.

In this manner 121 is entered into columns 5, 4, 3 of register 11.

*Sequence 22.*—The test here indicates the "go" condition A so that cross adding takes place, and a 1 is entered in column 3 of register 20. The entering circuit is traceable in Fig. 1c from line 14, contacts C52, b contacts of magnet RTC2, b contacts of magnet SP1, b contacts of magnet NG, b contacts of 1 magnet RSC (shifted), b contacts of 2 magnet RSC, second row of b contacts of 3, 2 and 1 magnets CS (of which the last is shifted) to the 1 magnet RG in column 3 of register 20 to obtain the new setting 61 which holds through RE20 contacts and C149. The following sets of impulses or sequences repeat with amounts 123 and 125 entered in succession in register 11 and with the operations occurring as indicated in Figs. 4a and 5 in the now familiar manner.

As indicated in Fig. 5, the 1 magnets CS and RSC are energized at sequence 22 through the above traced circuit, to enter a 1 in column 3 of register 20 (see Fig. 1c), through now shifted contacts of these two magnets. At sequence 25, the 2 magnet RSC will have been energized so that the root digit entering circuit extends through b contacts of 1 magnet RSC (shifted), b contacts of 2 magnet RSC (shifted), b contacts of 3 magnet RSC (normal), b contacts of 3, 2 and 1 magnets CS (with the last shifted) and to the 2 magnet RG in column 3 of register 20.

It is noted that now both the 1 and 2 RG magnets in this column are energized and during the next set of sequences with the 3 magnet RSC energized, similar circuits will be completed to energize the 3 magnet RG in column 3 so that then the 1, 2 and 3 magnets will all be energized. The value represented will be the highest among 1, 2, 3 and 4 supplemented by 5 or 0. In reading out such values, the highest of 1, 2, 3 or 4 controls as is evident in Fig. 1d where the readout circuit from wire 77 extends to the contacts of 4 magnet RG and, if this shifted, the feed circuit is broken to 3, 2 and 1. Similarly, if the setting represents a 3, the feed circuit extends to and through the 3 contacts and is broken to the 2 and 1 contacts. It is therefore not necessary in register 20, to unset lower value magnets RG when the setting is raised one unit from 1 or 2 or 3.

*Sequence 34.*—At this time register 11 contains 127, register 20 contains 63 and register 12 contains 994034. A "no go" condition C is indicated so that operations as explained for sequence 14—17 are repeated to enter 6325 into register 11.

As indicated in Fig. 5, the 2 magnet CSC, the 3 magnet OSC, the 2 magnet CS, the 1X magnet and magnet RERS are picked up as a result of the "no go" condition through circuits similar to ones already traced.

In Fig. 1d, the e contacts of magnet 1X cause entry through b contacts of 3 magnet OS into columns 2 and 1 of register 11 of the digits 2 and 5. The 3 in column 3 of register 20 enters into column 3 of register 11 and the 6 in column 4 of register 20 enters into column 4 of register 11 as a 1 and a 5.

*Sequence 38.*—The test indicates another "no go" condition D, as for sequence 18 (see Fig. 4a) so that now, after clearing, the value 1261 is entered into register 11 and the several magnets are energized and held in the already described manner as represented in Fig. 5.

*Sequences 42—53.*—A succession of "go" conditions A now follow to set up 1263, 1265 and 1267 in succession and for each a 1 is added to column 2 of register 20 to raise it to 634.

*Sequence 54.*—At this time there is a "go" indication which will result in another series of operations in accordance with condition A and resulting in the entry of the next odd number 1269 during sequence 57, so that during the next sequence 58 a "no go" condition is present resulting in another C condition during which, as previously explained, register 11 is reset and during the sequence 61 a value 634 is entered under control of register 20 with a 25 suffixed thereto.

*Sequences 62—73.*—A test at this point results in the "go" condition B with cross adding effected and a 5 entered into column 1 of register 20. Following "go" conditions A cause entry of 12691, 12693 and 12695 to obtain the root value 6347 in the now familiar manner, so that just before sequence 74 register 12 contains the value 99997809 and register 11 contains the value 12695.

*Termination of computing.*—In Fig. 1a, a plug connection 87 will have been preliminarily made to one of a set of numbered sockets 88 in accordance with the desired number of root places. Thus, for the present example where four places are sought, the connection is made to the 4 socket 88. These sockets are wired to j contacts of magnets OSC which, as explained in the foregoing, are energized and held in succession.

As noted in Fig. 5, the 4 magnet OSC is energized at sequence 61 so that now, when the final "no go" condition (sequence 74) is indicated and the circuits in Fig. 1a are completed to energize magnets 1XC and RERS, magnet SP1 will be energized in parallel therewith through connection 87, j contacts of 4 magnet OSC and wire 89 and will hold through its e contacts and g contacts of magnet RST.

Magnet SP1 shifts its a contacts (Fig. 1b) to prevent pickup of OS, 1X or 2X magnets and opens its d contacts (Fig. 1c) to prevent pickup of CSC magnets.

In Fig. 1b a circuit is traceable from line 14, contacts C33, a contacts of magnet SP1 (shifted) and magnet SP2 to line 12 which holds through its f contacts and h contacts of magnet RST.

Magnet SP2 opens its a contacts (Fig. 1a) to prevent energization of magnets CA and RE16. It opens its d contacts (Fig. 1b) to prevent energization of magnets RS. It opens its b contacts (Fig. 1g) to prevent energization of magnets RI16. It opens its e contacts (Fig. 1b) to prevent energization of magnets RSC. It opens its c contacts (Fig. 1a) to prevent energization of magnets 2XC and 1XC.

The i contacts of magnet SP2 (Fig. 1a) will energize the restart magnet RST through contacts C42 so that the several circuits controlled by contacts of magnet RST will be broken, especially the holding circuits of magnets RTC1 and RCT2 (Fig. 1a), so that the machine comes to rest with the root 6347 standing in register 20 and the complement of the remainder in register 12.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a dividing machine, a register settable to represent a dividend, a register settable to represent a divisor in the form of a complement, a trial register, means controlled by said divisor register for entering the complement of 5 times the divisor, or the complement of 1 times the divisor into said trial register, comparing means controlled by the trial and dividend registers for ascertaining whether the amount set up in the trial register will go or will not go into the amount set up in the dividend register, means for initially causing the divisor register to control entry of the complement of 5 times the divisor into the trial register, and causing an operation of said comparing means, devices controlled by said comparing means upon ascertaining a no go condition with the complement of 5 times the divisor in the trial register, for causing resetting of the trial register and entry therein of the complement of 1 times the divisor.

2. In a dividing machine, a register settable to represent a dividend, a register settable to represent a divisor in the form of a complement, a trial register, means controlled by said divisor register for entering the complement of 5 times the divisor, or the complement of 1 times the divisor into said trial register, comparing means controlled by the trial and dividend registers for ascertaining whether the amount set up in the trial register will go or will not go into the amount set up in the dividend register, a fourth register, means for initially causing the divisor register to control entry of the complement of 5 times the divisor into the trial register, and causing an operation of said comparing means, devices controlled by said comparing means upon ascertaining a go condition with the complement of 5 times the divisor in the trial register, for causing addition of the amounts in the dividend and trial registers and entry of the sum into said fourth register, resetting of said dividend and trial registers, entry of said sum into the dividend register, and entry of the complement of 1 times the divisor into the trial register.

3. In a dividing machine, a divisor register settable to represent the complement of a divisor, a readout device adjusted thereby, said readout device comprising a set of contacts and interconnecting circuits, a trial register responsive to electrical impulses, and means for sending a single electrical impulse to said trial register, through said readout device, said readout device directing the impulse so as to cause entry into the trial register of an amount representing the complement of 5 times the amount whose complement is set in said divisor register.

4. In an electrical dividing machine, a divisor and a trial decimal register both having a plurality of decimal denominational orders, each of which orders comprises a group of five elements on which the digits may be represented in the quinary system of numeration, means for setting the elements of said divisor register to represent the complement of a divisor, means controlled by the divisor register for causing transfer into the trial register of the divisor complement, further means controlled by the divisor register for causing entry of the complement of 5 times the divisor into the trial register, and means for rendering either of said last two means effective.

5. In an electrical calculating machine, a first register, means for setting therein the complement of an amount, a second register, entering means therefor responsive to an electrical impulse, a first set of circuit connections adjusted by the first register to control the entering means of the second register in accordance with the complement set in the first register, a further set of circuit connections adjusted by the first register to control the entering means of the second register in accordance with the complement of 5 times the amount represented in the first register, and means for selectively transmitting an electrical impulse through either set of connections.

6. In a dividing machine, a divisor register, a dividend register, means for setting each to represent a related factor, a trial register, a fourth register, means controlled by the divisor register for initially setting said trial register to represent the complement of 5 times the divisor, comparing means controlled by the dividend and trial registers to ascertain whether the dividend is greater or less than the amount represented in the trial register, adding mechanism controlled by said comparing means when the dividend is greater, to obtain the algebraic sum of the amounts compared and enter the result in the fourth register, means to transfer the result from said fourth register to said dividend register, means for resetting the dividend and trial registers prior to said transfer, and means for causing the divisor register to set the trial register to represent the complement of the divisor after said transfer.

7. In a dividing machine, a dividend register, a divisor register and a trial register, means for setting a dividend and a divisor in their respective registers, means controlled by the divisor register for selectively setting the complement of the divisor or the complement of 5 times the divisor in said trial register, resetting means for the dividend and trial registers, a fourth register, means for comparing the trial and dividend registers for each entry into the trial register, devices controlled thereby when the trial register is set to represent the complement of 5 times the divisor and when 5 times the divisor is less than the dividend for effecting subtraction, operation of both resetting means, entry of the remainder into the fourth register and retransfer of the remainder to the dividend register, devices controlled by the comparing means when the trial register is set to represent the complement of 5 times the divisor and when 5 times the divisor is greater than the dividend for effecting resetting of the trial register, devices controlled by the comparing means when the trial register is set to represent the complement of the divisor and when the divisor is less than the dividend for effecting subtraction, operation of the dividend resetting means, entry of the remainder into the fourth register and retransfer of the remainder to the dividend register, and devices controlled by the comparing means when the trial register is set to represent the complement of the divisor and when the divisor is greater than the dividend for resetting the dividend and trial registers and entering the last remainder into the dividend register with a columnar displacement to the left.

8. In a machine of the class described, a register settable to represent a number whose square root is sought, a trial register, an intermediate register, a root register, means for initially setting said trial register to represent the square of 5, means for comparing said square with the highest part of said number, means controlled by the comparing means when the square is less than said highest part, for subtracting said square to obtain and enter the remainder in said intermediate register, resetting the number and trial registers, and entering the remainder in the number register, further means controlled by the comparing means for entering a 5 into said root register, and means thereafter effective under control of the root register for causing entry into the trial register of twice the amount in the root register plus 1.

9. In a square root extracting mechanism, a number register settable to represent a number, a trial register, an intermediate register, a root register, means for setting up a predetermined trial square in said trial register, means controlled by the number and trial register for testing to ascertain if said trial square will go or not go into the number, means for subtracting the trial square from said number and entering the remainder in the intermediate register, means for resetting the number and trial registers, means for transferring the remainder from the intermediate register to the number register, devices controlled by said testing means, upon occurrence of a go condition for rendering the last three means effective in order, further means controlled by said testing means, upon occurrence of a go condition, for entering the root of the trial square into said root register, and means controlled by the root register for entering into the trial register an amount representing the difference between said trial square and the square of the next higher number.

10. In a square root extracting mechanism, a number register settable to represent a number, a trial register, a root register, means for setting up a predetermined trial square in said trial register, means controlled by the number and trial registers for testing to ascertain if the trial square will go or not go into the number, means for resetting the trial register, means controlled by the root register for entering into the trial register a number representing 2 times the amount in the root register plus 1, and devices controlled by said testing means upon occurrence of a no go condition for rendering said last two means effective in order.

11. In a machine of the class described, a root register settable to represent an amount, a number register, entering means therefor responsive to an electrical impulse, contacts settable by the root register, circuit connections between said contacts and the entering means of the number register, control means for adjusting said connections to cause the contacts to control the entering means of the number register to enter therein 100 times said amount, means for sending an electrical impulse through said contacts and adjusted connections, and means effective concurrently therewith for entering an additional 25 into said number register.

12. In a machine of the class described, a root register settable to represent an amount, a number register, entering means therefor responsive to an electrical impulse, contacts settable by the root register, circuit connections between said contacts and the entering means of the number register, control means for adjusting said connections to cause the contacts to control the entering means of the number register to enter therein 2 times said amount plus 1, further control means for adjusting said connections to cause the contacts to control the entering means of the number register to enter therein 100 times said amount, devices for selectively rendering either of said control means effective, and means for sending an electrical impulse through the contacts and adjusted connections.

13. In a square root extracting mechanism, a register settable to represent a number, means for successively reducing said number by each of the terms of the odd number series 1, 3, 5, 7, 9, 11, 13, etc. including means for first testing whether the sum of the first five terms will go into the number, means controlled thereby if such sum goes, for controlling said reducing means to cause reduction of the number by 25 and thereafter causing further reduction of the number by the succeeding terms, and means controlled by the testing means, if such sum does not go, for successively reducing the number by each of the first four terms of the series.

BENJAMIN M. DURFEE.

REFERENCES CITED

The following references are of record in the file of this patent:

UNITED STATES PATENTS

| Number | Name | Date |
|---|---|---|
| 2,199,537 | Campbell | May 7, 1940 |
| 2,307,116 | Dickinson | Jan. 5, 1943 |
| 2,318,591 | Couffignal | May 11, 1943 |
| 2,328,623 | Dickinson | Sept. 7, 1943 |
| 2,394,924 | Luhn | Feb. 12, 1946 |